(12) United States Patent
Qiu et al.

(10) Patent No.: US 12,072,075 B2
(45) Date of Patent: Aug. 27, 2024

(54) PRIMARY OPTICAL STRUCTURE, HIGH-BEAM LIGHTING DEVICE, ANTI-GLARE HIGH-BEAM LAMP AND VEHICLE

(71) Applicant: HASCO VISION TECHNOLOGY CO., LTD., Shanghai (CN)

(72) Inventors: Zhiping Qiu, Shanghai (CN); Cong Li, Shanghai (CN); Meng Yan, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/912,232

(22) PCT Filed: Jan. 8, 2021

(86) PCT No.: PCT/CN2021/070937
§ 371 (c)(1),
(2) Date: Sep. 16, 2022

(87) PCT Pub. No.: WO2021/208536
PCT Pub. Date: Oct. 21, 2021

(65) Prior Publication Data
US 2023/0137589 A1 May 4, 2023

(30) Foreign Application Priority Data

Apr. 17, 2020 (CN) .......................... 202010305971.2
Apr. 17, 2020 (CN) ......................... 202010305977.X
Apr. 17, 2020 (CN) .......................... 202010307143.2

(51) Int. Cl.
*F21S 41/43* (2018.01)
*F21S 41/147* (2018.01)
(Continued)

(52) U.S. Cl.
CPC .......... *F21S 41/683* (2018.01); *F21S 41/147* (2018.01); *F21S 41/25* (2018.01); *F21S 41/32* (2018.01);
(Continued)

(58) Field of Classification Search
CPC ............ F21W 2102/13; F21W 2102/15; F21S 41/683; F21S 41/25; F21S 41/32; F21S 41/285; F21S 41/295; B60Q 1/04
See application file for complete search history.

(56) References Cited

U.S. PATENT DOCUMENTS

2005/0134483 A1 6/2005 Monji et al.
2007/0165416 A1 7/2007 Ishida et al.
(Continued)

FOREIGN PATENT DOCUMENTS

CN 103381771 A 11/2013
CN 103906969 A 7/2014
(Continued)

*Primary Examiner* — Omar Rojas Cadima
(74) *Attorney, Agent, or Firm* — Volpe Koenig

(57) ABSTRACT

Disclosed are a primary optical structure, a high-beam lighting device, and an anti-glare high-beam light. The primary optical structure comprises a reflection unit and a shading structure located in front for blocking part of the reflected light from the reflection unit. The primary optical structure is configured for use in a left vehicle lamp or a right vehicle lamp, where the shading structure is arranged at a left side portion or a right side portion of the lamp, respectively. The light blocked by the shading structure and the light that is not blocked are bounded by a right side edge or a left side edge respectively, and an upper side edge of the shading structure. In a vehicle lamp, the primary optical structure can form a high-beam profile having a dark area to prevent glare, such that the dark area formed has an adjustable width and position, improving driving safety.

16 Claims, 16 Drawing Sheets

(51) Int. Cl.
*F21S 41/25* (2018.01)
*F21S 41/32* (2018.01)
*F21S 41/683* (2018.01)
*F21S 45/47* (2018.01)
*F21W 102/13* (2018.01)

(52) U.S. Cl.
CPC ............... *F21S 41/43* (2018.01); *F21S 45/47* (2018.01); *F21W 2102/13* (2018.01)

(56) References Cited

U.S. PATENT DOCUMENTS

| | | | |
|---|---|---|---|
| 2008/0239744 | A1 | 10/2008 | Nakada et al. |
| 2008/0253141 | A1 | 10/2008 | Nakada et al. |
| 2009/0190324 | A1 | 7/2009 | Watanabe et al. |
| 2009/0315479 | A1 | 12/2009 | Hayakawa |
| 2016/0238210 | A1* | 8/2016 | Masuda ................ F21S 41/692 |
| 2020/0063939 | A1 | 2/2020 | Qiu et al. |

FOREIGN PATENT DOCUMENTS

| | | | | |
|---|---|---|---|---|
| CN | 104864335 | A | 8/2015 | |
| CN | 105570794 | A | 5/2016 | |
| CN | 106060997 | A | 10/2016 | |
| CN | 106641964 | A | 5/2017 | |
| CN | 207762807 | U | 8/2018 | |
| CN | 108758548 | A | 11/2018 | |
| CN | 109838748 | A | 6/2019 | |
| CN | 110248843 | A | 9/2019 | |
| CN | 110939912 | A | 3/2020 | |
| CN | 212081115 | U | 12/2020 | |
| CN | 212204381 | U | 12/2020 | |
| EP | 2028414 | A1 * | 2/2009 | .......... F21S 48/1154 |
| EP | 2103868 | A2 * | 9/2009 | .......... B60Q 1/1423 |
| EP | 2399776 | A2 | 12/2011 | |
| EP | 2495128 | A2 | 9/2012 | |
| EP | 2495129 | A2 | 9/2012 | |
| JP | 2009269510 | A | 11/2009 | |
| JP | 2010000957 | A | 1/2010 | |
| JP | 2011037343 | A | 2/2011 | |
| JP | 2013139262 | A | 7/2013 | |
| JP | 5260098 | B2 | 8/2013 | |
| JP | 5500265 | B2 | 5/2014 | |
| JP | 2016043887 | A | 4/2016 | |
| JP | 2016120871 | A | 7/2016 | |
| WO | 2019006481 | A | 1/2019 | |
| WO | 2020039890 | A1 | 2/2020 | |

* cited by examiner

PRIMARY OPTICAL STRUCTURE, HIGH-BEAM LIGHTING DEVICE, ANTI-GLARE HIGH-BEAM LAMP AND VEHICLE

CROSS REFERENCE TO RELATED APPLICATIONS

This application is a 35 USC § 371 National Stage application of International Patent Application No. PCT/CN2021/070937, which was filed Jan. 8, 2021, entitled "PRIMARY OPTICAL STRUCTURE, HIGH-BEAM LIGHTING DEVICE, ANTI-GLARE HIGH-BEAM LAMP AND VEHICLE" and claims priority to Chinese Patent Application Nos. 202010305971.2, 202010305977.X, and 202010307143.2 filed on Apr. 17, 2020, which are incorporated herein by reference as if fully set forth.

TECHNICAL FIELD

The present disclosure relates to vehicle lamps and specifically relates to a primary optical structure. In addition, the present disclosure also relates to a high-beam lighting device, an anti-glare high-beam lamp and a vehicle.

BACKGROUND ART

People are paying more and more attention to driving safety. Every year, there are many driving accidents caused by improper use of high-beam lamps. For example, when a driver is driving at night and meeting a vehicle or when there are vehicles in front, the high-beam lamps usually need to be switched into low-beam lamps to prevent dazzling, or when a driver is overtaking a vehicle in front, the high-beam lamps are switched into the low-beam lamps to avoid causing trouble to the vehicle in front. However, there is a contradiction in overtaking that a driver needs to see as far as possible, but cannot use the high beams, and thus there is a potential danger.

The problems above can be solved by using anti-glare high-beam lamps. By using the anti-glare high-beam lamps, a dark area can be formed in an area where a vehicle on the opposite side or in front is located without affecting other illumination areas. The road in front of this vehicle can be fully illuminated without interfering with other vehicles, and therefore the safety of driving at night is improved. The Chinese patent CN207762807U can be taken as a reference to an existing anti-glare high-beam lamp structure. The shading structures of the vehicle left lamp and the vehicle right lamp adopted are mechanically rotating, and a dark area is formed at the position of a vehicle in front of the automobile to achieve no dazzling.

The technical solutions above have the following shortcomings: first, the anti-glare high-beam lamps need to be separately equipped with light-shielding rollers and driving structures for driving the light-shielding rollers to rotate, and a system structure is very complicated; second, the widening angles of the left and right lamps are fixed and not adjustable, when the formed dark area needs to become larger or move left and right, an illumination range is larger than a detection range of a vehicle camera, and dazzling is caused to vehicles outside the detection range, or when lamps on one side are turned off, the illumination range is too small, and the driving safety of this vehicle driver is affected.

SUMMARY

A problem to be solved firstly in the present disclosure is to provide a primary optical structure, and the primary optical structure can form a main high-beam light shape with a dark area when being applied to a left vehicle lamp and a right vehicle lamp to prevent dazzling.

In addition, a problem to be solved in the present disclosure is to provide a high-beam lighting device, a high-beam light shape formed by the lighting device can be used for preventing dazzling, and the precision of an optical system is high.

Further, a problem to be solved in the present disclosure is to provide an anti-glare high-beam lamp, and the high-beam lamp can form a dark area adjustable in width and position, so that the driving safety is improved.

Furthermore, a problem to be solved in the present disclosure is to provide a vehicle, the vehicle can be used for preventing dazzling, and can form a dark area adjustable in width and position, so that the driving safety is improved.

In order to solve the technical problems above, the present disclosure provides a primary optical structure. The primary optical structure is applied to a left vehicle lamp and a right vehicle lamp, and includes a reflection unit and a shading structure located in front of the reflection unit. The shading structure can block part of reflected light from the reflection unit, and the primary optical structure is configured to be one of the following two structures:

where the primary optical structure is for use in the left vehicle lamp, the shading structure is arranged at the left side portion in front of the reflection unit, and the light blocked by the shading structure and the light that is not shielded are bounded by a right side edge and an upper side edge of the shading structure; when the primary optical structure is for use in the right vehicle lamp, the shading structure is arranged at the right side portion in front of the reflection unit, and the light blocked by the shading structure and the light that is not shielded are bounded by a left side edge and an upper side edge of the shading structure.

Preferably, the shading structure is arranged or integrally formed on the reflection unit.

More preferably, where the primary optical structure is for use in the left vehicle lamp, the right side edge and the upper side edge of the shading structure are perpendicular to each other; and where the primary optical structure is for use in the right vehicle lamp, the left side edge and the upper side edge of the shading structure are perpendicular to each other.

Further preferably, the shading structure is a rectangular light-shielding plate.

Specifically, the reflection unit is provided with a heat sink.

A second aspect of the present disclosure is to provide a high-beam lighting device. The high-beam lighting device is applied to a left vehicle lamp and a right vehicle lamp and includes a main high-beam module, the main high-beam module comprises the primary optical structure, and the primary optical structure can enable the main high-beam module to form a main high-beam light shape with a light and shade cut-off line; where the high-beam lighting device is for use in the left vehicle lamp, the light and shade cut-off line is located on the right side of the main high-beam light shape; and where the high-beam lighting device is for use in the right vehicle lamp, the light and shade cut-off line is located on the left side of the main high-beam light shape.

Preferably, the main high-beam module further includes a main primary optical element, a main high-beam circuit board, a main high-beam lens and a main high-beam light source arranged on the main high-beam circuit board, wherein the reflection unit is arranged on the main primary optical element, the main high-beam circuit board and the main high-beam lens are connected to the main primary optical element, and light emitted by the main high-beam light source is reflected by the reflection unit, shielded by the shading structure, incident to the main high-beam lens and then projected by the main high-beam lens to form the main high-beam light shape with the light and shade cut-off line.

Specifically, the shading structure is arranged or integrally formed on the reflection unit.

As a preferred structural form, the main high-beam module is further provided with an auxiliary illumination module, light emitted by the auxiliary illumination module is projected by the main high-beam lens to form a main high-beam supplementary light shape, and the main high-beam supplementary light shape is located in a light-free area on one side of the light and shade cut-off line of the main high-beam light shape.

Preferably, an edge of the main high-beam supplementary light shape can be overlapped with the light and shade cut-off line.

More preferably, the auxiliary illumination module comprises an auxiliary illumination primary optical element, auxiliary illumination sources and an auxiliary illumination circuit board, wherein a light incident surface of the auxiliary illumination primary optical element is provided with at least one auxiliary condensation structure, and the auxiliary illumination sources are located on the auxiliary illumination circuit board and arranged in one-to-one correspondence to the auxiliary condensation structures, wherein the auxiliary illumination primary optical element is provided with an auxiliary light-emitting surface facing the main high-beam lens, and light emitted by the auxiliary illumination sources is transmitted through the auxiliary illumination primary optical element, emitted to the main high-beam lens through the auxiliary light-emitting surface and then projected by the main high-beam lens to form the main high-beam supplementary light shape.

Further preferably, the auxiliary illumination primary optical element is located between the main primary optical element and the main high-beam lens, and the shading structure is arranged or integrally formed on the auxiliary illumination primary optical element.

Specifically, a side surface of the main high-beam lens which is connected to a light-emitting surface of this main high-beam lens is provided with a main light-shielding cover.

As another preferred structural form, the high-beam lighting device further comprises an auxiliary high-beam module which can form an auxiliary high-beam light shape adjustable in widening angle, and the main high-beam light shape is overlapped with the auxiliary high-beam light shape to form a high-beam light shape with the light and shade cut-off line and adjustable in light shape widening angle.

Preferably, the auxiliary high-beam module comprises an auxiliary primary optical element, auxiliary high-beam light sources, an auxiliary high-beam circuit board and an auxiliary high-beam lens, wherein a light incident surface of the auxiliary primary optical element is provided with multiple condensation structures, and the auxiliary high-beam light sources are located on the auxiliary high-beam circuit board and arranged in one-to-one correspondence to the condensation structures, wherein each of the auxiliary high-beam light sources can be turned on or off separately, and a light-emitting surface of the auxiliary primary optical element faces the auxiliary high-beam lens.

A third aspect of the present disclosure is to provide an anti-glare high-beam lamp. The anti-glare high-beam lamp comprises a left vehicle lamp and a right vehicle lamp, wherein the left vehicle lamp and the right vehicle lamp are each provided with the high-beam lighting device according to any one above, the left vehicle lamp can form a left vehicle lamp main high-beam light shape with a left vehicle lamp light and shade cut-off line, the right vehicle lamp can form a right vehicle lamp main high-beam light shape with a right vehicle lamp light and shade cut-off line, and the left vehicle lamp main high-beam light shape can be overlapped with the right vehicle lamp main high-beam light shape to form a high-beam central area light shape with a dark area, wherein the dark area is located between the left vehicle lamp light and shade cut-off line and the right vehicle lamp light and shade cut-off line, and the left vehicle lamp main high-beam light shape and/or the right vehicle lamp main high-beam light shape can move left and right to adjust the width and position of the dark area.

Preferably, the left vehicle lamp and the right vehicle lamp are each provided with the high-beam lighting device including the auxiliary high-beam module, the left vehicle lamp can form the left vehicle lamp main high-beam light shape and a left vehicle lamp auxiliary high-beam light shape adjustable in widening angle, and the right vehicle lamp can form the right vehicle lamp main high-beam light shape and a right vehicle lamp auxiliary high-beam light shape adjustable in widening angle; the left vehicle lamp main high-beam light shape is overlapped with the left vehicle lamp auxiliary high-beam light shape to form a left vehicle lamp high-beam light shape with the left vehicle lamp light and shade cut-off line and adjustable in light shape widening angle, the right vehicle lamp main high-beam light shape is overlapped with the right vehicle lamp auxiliary high-beam light shape to form a right vehicle lamp high-beam light shape with the right vehicle lamp light and shade cut-off line and adjustable in light shape widening angle, and the left vehicle lamp high-beam light shape is overlapped with the right vehicle lamp high-beam light shape to form a high-beam light shape with the dark area and adjustable in light shape widening angle.

Specifically, the left vehicle lamp and the right vehicle lamp each include a driving mechanism for driving the high-beam lighting device to move left and right.

A fourth aspect of the present disclosure is to provide a vehicle comprising the anti-glare high-beam lamp according to any one above.

It can be seen from the technical solutions above of the present disclosure that the shading structure of the primary optical structure of the present disclosure can shield part of reflected light from the reflection unit, so that when the primary optical structure is applied to the left vehicle lamp and the right vehicle lamp, the left vehicle lamp and the right vehicle lamp can respectively form the left vehicle lamp main high-beam light shape with the left vehicle lamp light and shade cut-off line and the right vehicle lamp main high-beam light shape with the right vehicle lamp light and shade cut-off line, and then the left vehicle lamp main high-beam light shape is overlapped with the right vehicle lamp main high-beam light shape to form a high-beam light shape with a dark area. When high beams of vehicle lamps are used and there is a vehicle or pedestrian on the opposite side or in front, there is no light in the dark area to prevent causing dazzling to the driver of the vehicle or pedestrian on the opposite side or in front. In the present disclosure, when the high-beam lighting device based on the primary optical structure is applied to the left vehicle lamp and the right vehicle lamp, the high-beam lighting device can be driven by the driving mechanism to move left and right, so that the high-beam lighting device of the left vehicle lamp cooperates with the high-beam lighting device of the right vehicle lamp to move left and right to adjust the width and position of the dark area so as to meet more illumination requirements of a driving environment, and the applicability of the vehicle lamps is improved.

Other advantages and technical effects of preferred embodiments of the present disclosure are further described in the following specific embodiments.

BRIEF DESCRIPTION OF THE DRAWINGS

FIG. 19 shows a light path diagram when all auxiliary high-beam light sources in the auxiliary high-beam module shown in FIG. 18 are turned on;

FIG. 25 shows a light shape diagram of an auxiliary high-beam module applied to a left vehicle lamp and a right vehicle lamp when all auxiliary high-beam light sources are turned on;

FIG. 29 shows a left vehicle lamp full high-beam light shape formed after a left vehicle lamp main high-beam light shape is overlapped with a left vehicle lamp auxiliary high-beam light shape when all auxiliary high-beam light sources of a left vehicle lamp are turned on;

FIG. 30 shows a right vehicle lamp full high-beam light shape formed after a right vehicle lamp main high-beam light shape is overlapped with a right vehicle lamp auxiliary high-beam light shape when all auxiliary high-beam light sources of a right vehicle lamp are turned on;

Figure 1:
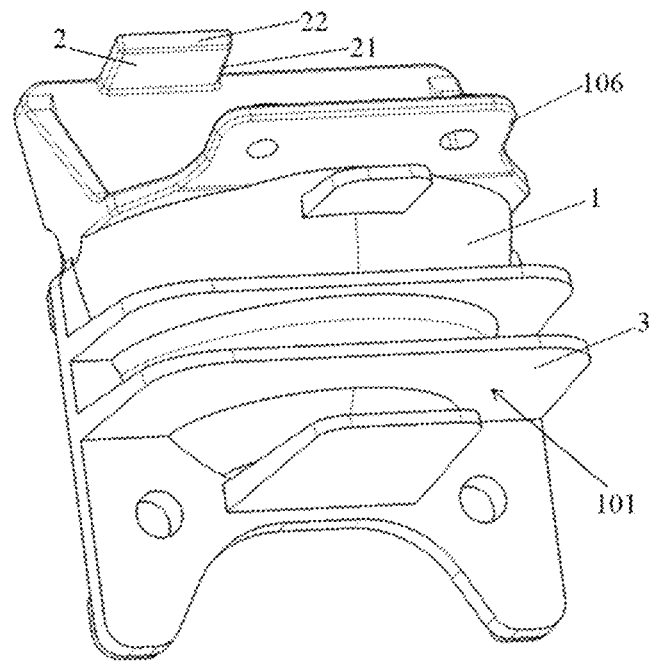
FIG. 1 shows a structural schematic diagram of a primary optical structure applied to a left vehicle lamp in a specific embodiment.

BRIEF DESCRIPTION OF DRAWING SYMBOLS 1 reflection unit; 2 shading structure; 21 right side edge; 22 upper side edge; 23 left side edge; 3 heat sink; 100 main high-beam module; 101 main primary optical element; 102 main high-beam circuit board; 103 main high-beam light source; 104 main high-beam lens; 105 main high-beam lens connecting part; 106 main primary optical element connecting part; 107 main high-beam radiator; 108 main light-shielding cover; 200 auxiliary high-beam module; 201 auxiliary primary optical element; 202 condensation structure; 203 auxiliary high-beam light source; 204 auxiliary high-beam lens; 205 auxiliary high-beam circuit board; 206 auxiliary high-beam radiator; 300 auxiliary illumination module; 301 auxiliary condensation structure; 302 auxiliary illumination primary optical element; 303 auxiliary illumination circuit board; 304 auxiliary illumination radiator; 305 auxiliary illumination source; 306 auxiliary light-emitting surface; 001 left vehicle lamp high-beam light shape; 002 right vehicle lamp high-beam light shape; 003 dark area; 004 left vehicle lamp main high-beam light shape; 005 left vehicle lamp auxiliary high-beam light shape; 006 left vehicle lamp light and shade cut-off line; 007 right vehicle lamp main high-beam light shape; 008 right vehicle lamp auxiliary high-beam light shape; 009 right vehicle lamp light and shade cut-off line.

DETAILED DESCRIPTION OF THE EMBODIMENTS

Specific embodiments of the present disclosure are described in detail below with reference to the accompanying drawings. It should be understood that the detailed description of the embodiments is only used to illustrate and explain the present disclosure, but not used to limit the present disclosure.

In the description of the present disclosure, it should be explained first that some orientation words involved in the following description are used for clearly explaining technical solutions of the present disclosure. For example, "left and right" refers to the left-right direction of a vehicle in a normal driving state. In addition, according to provisions in GB4599-2007, light distribution performance of vehicle headlamps should be tested on a light distribution screen 25 m away from the front of a reference center of the headlamps; a light and shade cut-off line is a dividing line with visually perceived obvious light and shade changes after a light beam is projected on the light distribution screen. It should be explained that an L-shaped left vehicle lamp light and shade cut-off line is an L-shaped light and shade cut-off line, and an inverted L-shaped right vehicle lamp light and shade cut-off line is a light and shade cut-off line in a shape in bilateral symmetry to "L".

In the description of the present disclosure, it should be explained that unless otherwise clearly specified and defined, terms "connection" and "installation" should be understood in a broad sense. For example, connection may be fixed connection, detachable connection, integral connection, direct connection, indirect connection through an intermediate medium, communication between two components or can be an interaction relationship between two components. For those of ordinary skill in the art, specific meanings of the terms above in the present disclosure can be understood according to specific circumstances.

The first aspect of the present disclosure is to provide a primary optical structure. The primary optical structure is applied to a left vehicle lamp and a right vehicle lamp, referring to FIGS. 1 to 3, the primary optical structure includes a reflection unit 1 and a shading structure 2 located in front of the reflection unit 1, the shading structure 2 can block part of reflected light from the reflection unit 1, and the primary optical structure is configured to be one of the following two structures: where the primary optical structure is for use in the left vehicle lamp, the shading structure 2 is arranged at the left side portion in front of the reflection unit 1, and the light blocked by the shading structure 2 and the light that is not blocked are bounded by a right side edge 21 and an upper side edge 22 of the shading structure 2; where the primary optical structure is for use in the right vehicle lamp, the shading structure 2 is at the right side portion in front of the reflection unit 1, and the light shielded by the shading structure 2 and the light that is not shielded are bounded by a left side edge 23 and the upper side edge 22 of the shading structure 2.

It should be noted that the reflection unit 1 may be a reflecting mirror, a component with a reflecting surface, or a component with a light reflecting function. According to the primary optical structure of the basic technical solution in the present disclosure, the shading structure 2 can shield part of reflected light of the reflection unit 1 so that part of the reflected light cannot be projected to the front of a vehicle, and a light-free area is formed in front of the vehicle. Specifically, when the primary optical structure is applied to the left vehicle lamp, the light shielded by the shading structure 2 and the light that is not shielded are bounded by the right side edge 21 and the upper side edge 22 of the shading structure 2, so that the left vehicle lamp forms a left vehicle lamp shape with a left light and shade cut-off line; when the primary optical structure is applied to the right vehicle lamp, the light shielded by the shading structure 2 and the light that is not shielded are bounded by the left side edge 23 and the upper side edge 22 of the shading structure 2, so that the right vehicle lamp forms a right vehicle lamp shape with a right light and shade cut-off line.

In the present disclosure, a high-beam light shape can be formed after the left vehicle lamp shape is overlapped with the right vehicle lamp shape, and may be a conventional high-beam light shape or a high-beam central area light shape located in a high-beam light shape central area. In the present disclosure, a high-beam central area light shape is formed after the primary optical structure is applied to a high-beam lighting device. The second aspect of the present disclosure is to provide a high-beam lighting device. The high-beam lighting device includes a main high-beam module 100, wherein the main high-beam module 100 includes the primary optical structure, and the primary optical structure can enable the main high-beam module 100 to form a main high-beam light shape with a light and shade cut-off line; when the high-beam lighting device is applied to the left vehicle lamp, the light and shade cut-off line is located on the right side of the main high-beam light shape; when the high-beam lighting device is applied to the right vehicle lamp, the light and shade cut-off line is located on the left side of the main high-beam light shape.

Figure 20:
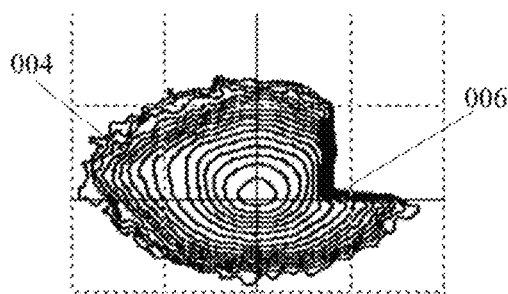
FIG. 20 shows a left vehicle lamp main high-beam light shape in a specific embodiment.
Figure 21:
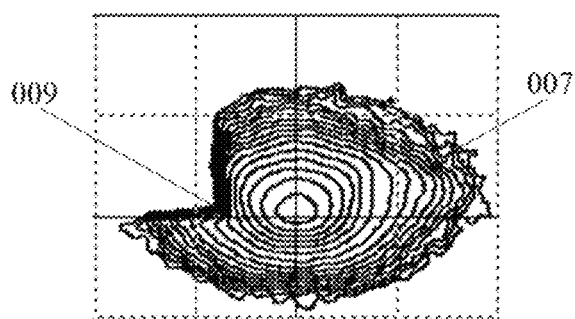
FIG. 21 shows a right vehicle lamp main high-beam light shape in a specific embodiment.
Figure 22:
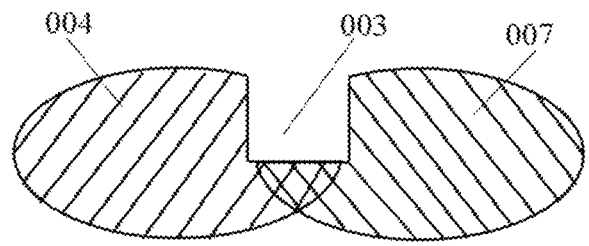
FIG. 22 shows a high-beam central area light shape formed after the light shapes shown in FIG. 20 and FIG. 21 are overlapped.

Correspondingly, when the high-beam lighting device is applied to the left vehicle lamp, a left vehicle lamp main high-beam light shape 004 with a left vehicle lamp light and shade cut-off line 006 as shown in FIG. 20 is formed; when the high-beam lighting device is applied to the right vehicle lamp, a right vehicle lamp main high-beam light shape 007 with a right vehicle lamp light and shade cut-off line 009 as shown in FIG. 21 is formed. The high-beam lighting device can be applied to a left vehicle lamp and a right vehicle lamp of an anti-glare high-beam lamp, and preferably, the left vehicle lamp and the right vehicle lamp each include a driving mechanism for driving the high-beam lighting device to move left and right. When there is a vehicle or pedestrian on the opposite side or in front of this vehicle, the left vehicle lamp main high-beam light shape 004 and the right vehicle lamp main high-beam light shape 007 are moved left and right according to the position of the vehicle or pedestrian and the width of an area where the vehicle or pedestrian is located, a high-beam central area light shape with a dark area 003 as shown in FIG. 22 is formed after the two light shapes are overlapped, and the dark area 003 is located between the left vehicle lamp light and shade cut-off line 006 and the right vehicle lamp light and shade cut-off line 009. The dark area 003 covers the area where the vehicle or pedestrian on the opposite side or in front is located, so that interference caused to a driver of the vehicle or pedestrian on the opposite side or in front can be effectively avoided, and dazzling is prevented. When there is no vehicle or pedestrian on the opposite side or in front of this vehicle, the left vehicle lamp main high-beam light shape 004 and the right vehicle lamp main high-beam light shape 007 are moved left and right to enlarge an overlapped part of the two light shapes to prevent the dark area 003 from being generated after the two light shapes are overlapped, so that enough high-beam illumination can be provided for the driver of this vehicle.

According to the primary optical structure in a preferred embodiment, the shading structure 2 is arranged or integrally formed on the reflection unit 1, so that the optical accuracy of the primary optical structure can be effectively improved, and the design is more compact.

Figure 4:
FIG. 4 shows a schematic diagram of a left vehicle lamp light and shade cut-off line and a right vehicle lamp light and shade cut-off line in a first specific embodiment.
Figure 5:
FIG. 5 shows a schematic diagram of a left vehicle lamp light and shade cut-off line and a right vehicle lamp light and shade cut-off line in a second specific embodiment.
Figure 6:
FIG. 6 shows a schematic diagram of a left vehicle lamp light and shade cut-off line and a right vehicle lamp light and shade cut-off line in a third specific embodiment.

In the present disclosure, the right side edge 21 and the upper side edge 22 of the shading structure 2 in the left vehicle lamp and the left side edge 23 and the upper side edge 22 of the shading structure 2 in the right vehicle lamp are designed to form the left vehicle lamp light and shade cut-off line 006 and the right vehicle lamp light and shade cut-off line 009 which are in bilateral symmetry or approximate symmetry. Exemplarily, referring to FIGS. 4 to 6, the left vehicle lamp light and shade cut-off line 006 and the right vehicle lamp light and shade cut-off line 009 may be in L-shapes, inward folding shapes, outward folding shapes or L-shapes with rounded corners in bilateral symmetry or approximate symmetry, and the shading structure 2 is designed to have a corresponding edge shape. According to a shading structure 2 in a preferred embodiment of the present disclosure, when the primary optical structure is applied to the left vehicle lamp, the right side edge 21 and the upper side edge 22 of the shading structure 2 are perpendicular to each other; when the primary optical structure is applied to the right vehicle lamp, the left side edge 23 and the upper side edge 22 of the shading structure 2 are perpendicular to each other. At this time, the shading structure 2 forms an L-shaped left vehicle lamp light and shade cut-off line 006 or an inverted L-shaped right vehicle lamp light and shade cut-off line 009.

Figure 2:
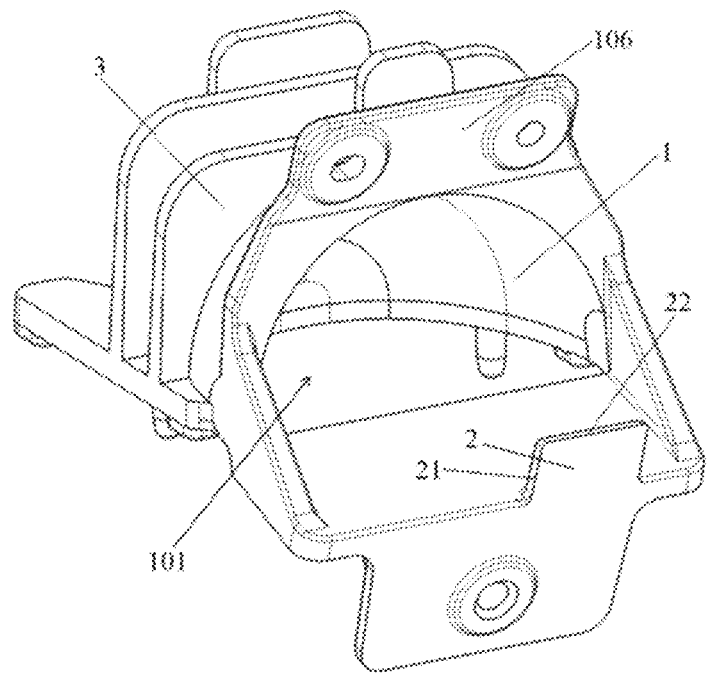
FIG. 2 shows a structural schematic diagram of the primary optical structure shown in FIG. 1 from another viewing angle.
Figure 3:
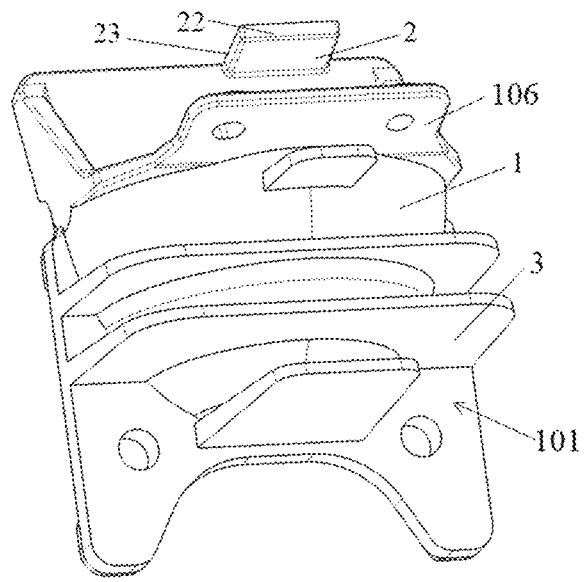
FIG. 3 shows a structural schematic diagram of a primary optical structure applied to a right vehicle lamp in a specific embodiment.

More preferably, referring to FIGS. 1 to 3, the shading structure 2 is a rectangular light-shielding plate. At this time, the right side edge 21 and the upper side edge 22 of the rectangular light-shielding plate can form a left cut-off part applicable to the left vehicle lamp so as to form an L-shaped left vehicle lamp light and shade cut-off line 006; the left side edge 23 and the upper side edge 22 of the rectangular light-shielding plate can form a right cut-off part applicable to the right vehicle lamp so as to form an inverted L-shaped right vehicle lamp light and shade cut-off line 009.

Further preferably, the reflection unit 1 is provided with a heat sink 3, so that dissipation of heat of the reflection unit 1 is facilitated, local temperature of the primary optical structure is prevented from being too high, and it is ensured that emergent light shape of the reflection unit 1 is stable and precise.

Figure 7:
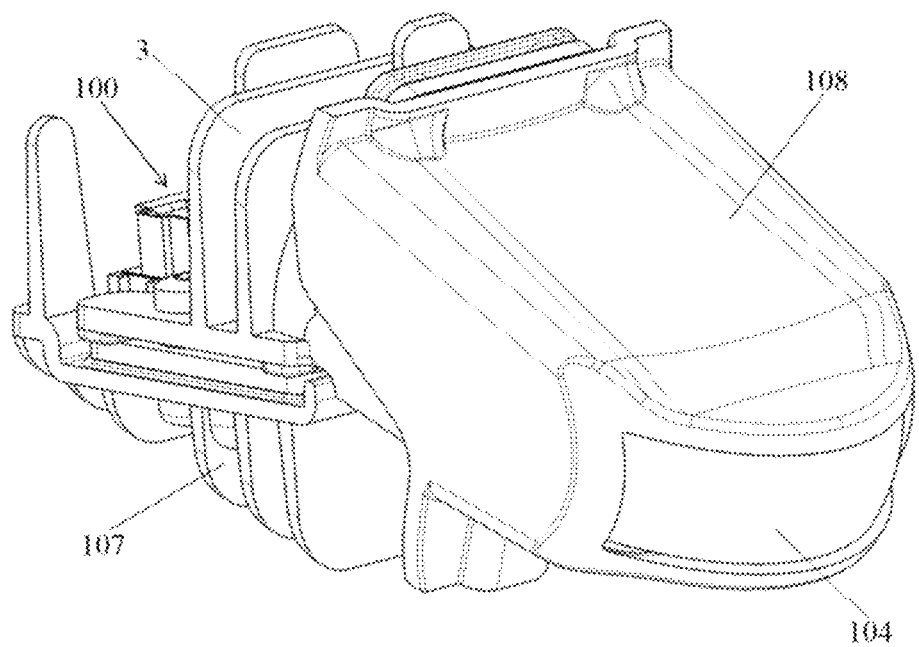
FIG. 7 shows a structural schematic diagram of a high-beam lighting device applied to a left vehicle lamp in a specific embodiment.
Figure 8:
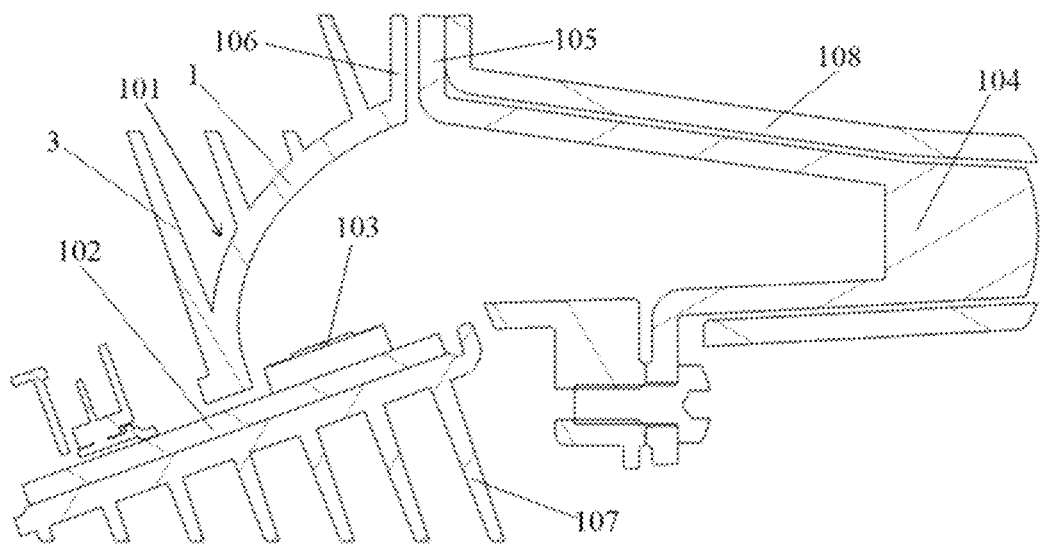
FIG. 8 shows a cross-sectional view of the high-beam lighting device shown in FIG. 7.
Figure 9:
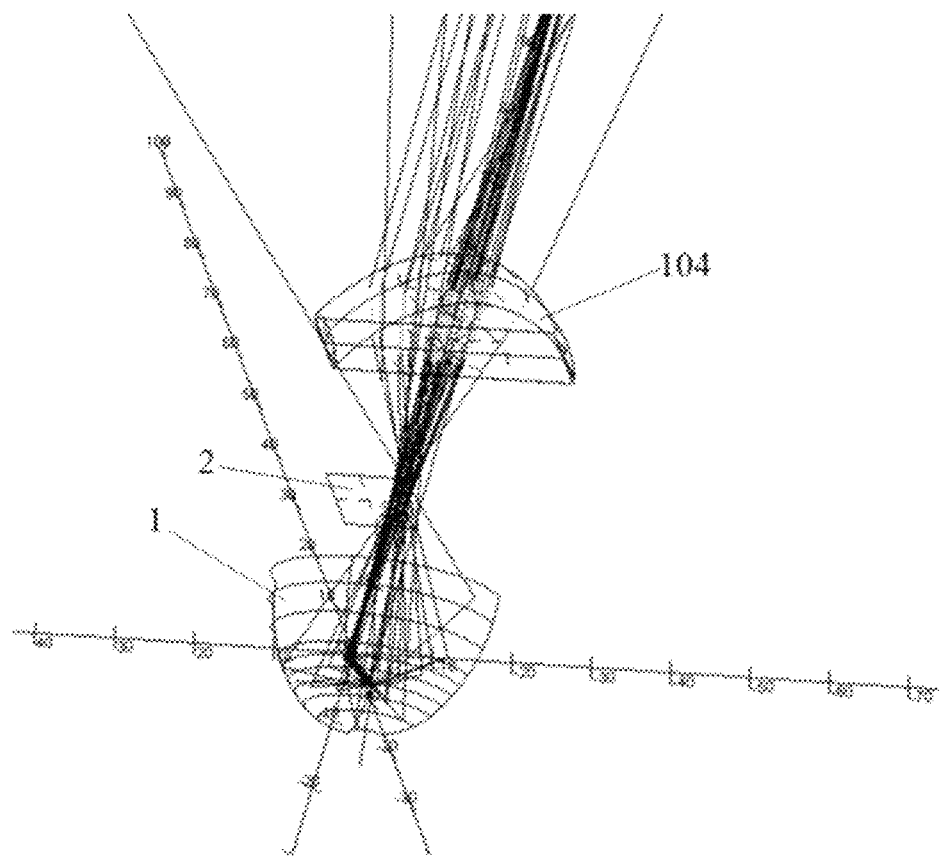
FIG. 9 shows a light path schematic diagram of the high-beam lighting device shown in FIG. 7.

According to a high-beam lighting device in a preferred embodiment of the present disclosure, referring to FIGS. 7 to 9, the main high-beam module 100 further includes a main primary optical element 101, a main high-beam circuit board 102, a main high-beam lens 104 and a main high-beam light source 103 arranged on the main high-beam circuit board 102, wherein the reflection unit 1 is arranged on the main primary optical element 101, the main high-beam circuit board 102 and the main high-beam lens 104 are connected to the main primary optical element 101, and light emitted by the main high-beam light source 103 is reflected by the reflection unit 1, blocked by the shading structure 2, incident to the main high-beam lens 104 and then projected by the main high-beam lens 104 to form the main high-beam light shape with the light and shade cut-off line. At this time, the main primary optical element 101 and the main high-beam lens 104 are directly positioned and installed to reduce use of auxiliary parts such as lens holders or transition supports, multiple assembly of parts is avoided, and the positioning precision of the main high-beam light source 103, the main primary optical element 101 and the main high-beam lens 104 is high, so that the precision of an optical system is improved, and the volume of the high-beam lighting device can be reduced at the same time.

According to a preferred specific structure of the main primary optical element 101 and the main high-beam lens 104, a main high-beam lens connecting part 105 is arranged or integrally formed on the main high-beam lens 104, a main primary optical element connecting part 106 is arranged or integrally formed on the main primary optical element 101, and the main high-beam lens connecting part 105 is connected to the main primary optical element connecting part 106. Due to arrangement of the main primary optical element connecting part 106 and the main high-beam lens connecting part 105, installation of the main primary optical element 101 and the main high-beam lens 104 is more stable, and positioning is more precise.

More preferably, a side surface of the main high-beam lens (104) which is connected to a light-emitting surface of this main high-beam lens 104 is provided with a main light-shielding cover 108, and the side, away from the main high-beam light source 103, of the main high-beam circuit board 102 is provided with a main high-beam radiator 107. The main light-shielding cover 108 and the main high-beam lens 104 may be connected by threaded connection, riveting, gluing or welding, only the light-emitting surface of the main high-beam lens 104 is exposed by the main light-shielding cover 108, so that emergent light of the main primary optical element 101 can be effectively prevented from being emitted from the side surface of the main high-beam lens 104. By using the main high-beam radiator 107, in-time dissipation of heat generated by the main high-beam light source 103 is facilitated, interference caused to the main high-beam light source 103 and the main high-beam circuit board 102 when the local temperature is too high is avoided, and the operation stability of the main high-beam light source 103 is kept.

Since only a high-beam central area light shape can be formed when the high-beam lighting device of the present disclosure is applied to the left vehicle lamp and the right vehicle lamp, correspondingly the high-beam lighting device is also provided with an auxiliary high-beam module 200 to form a high-beam widening area light shape which can be matched with the high-beam central area light shape, and a complete high-beam light shape is formed after the high-beam central area light shape and the high-beam widening area light shape are overlapped. That is the high-beam lighting device further includes an auxiliary high-beam module 200, which can form an auxiliary high-beam light shape adjustable in widening angle, and a main high-beam light shape is overlapped with the auxiliary high-beam light shape to form a high-beam light shape with a light and shade cut-off line and an adjustable light shape widening angle. At this time, referring to FIGS. 20 to 28, when the high-beam lighting device is applied to the left vehicle lamp, a left vehicle lamp main high-beam light shape 004 with a left vehicle lamp light and shade cut-off line 006 and a left vehicle lamp auxiliary high-beam light shape 005 adjustable in widening angle can be formed, and a left vehicle lamp high-beam light shape 001 adjustable in light shape widening angle is formed after the left vehicle lamp main high-beam light shape 004 is overlapped with the left vehicle lamp auxiliary high-beam light shape 005; when the high-beam lighting device is applied to the right vehicle lamp, a right vehicle lamp main high-beam light shape 007 with a right vehicle lamp light and shade cut-off line 009 and a right vehicle lamp auxiliary high-beam light shape 008 adjustable in widening angle can be formed, and a right vehicle lamp high-beam light shape 002 adjustable in light shape widening angle is formed after the right vehicle lamp main high-beam light shape 007 is overlapped with the right vehicle lamp auxiliary high-beam light shape 008; further, a high-beam light shape with a dark area 003 and an adjustable light shape widening angle can be formed after the left vehicle lamp high-beam light shape 001 is overlapped with the right vehicle lamp high-beam light shape 002.

When there is a vehicle or pedestrian on the opposite side or in front of this vehicle, the left vehicle lamp high-beam light shape 001 and the right vehicle lamp high-beam light shape 002 are moved left and right according to the position of the vehicle or pedestrian and the width of an area where the vehicle or pedestrian is located, a high-beam light shape with a dark area 003 is formed after the two light shapes are overlapped, and the dark area 003 is located between the left vehicle lamp light and shade cut-off line 006 and the right vehicle lamp light and shade cut-off line 009 and covers the area where the vehicle or pedestrian on the opposite side or in front is located, so that interference caused to a driver of the vehicle or pedestrian on the opposite side or in front can be effectively avoided, and dazzling is prevented; at the same time, the light shape widening angles of the left vehicle lamp high-beam light shape 001 and the right vehicle lamp high-beam light shape 002 are adaptively adjusted to meet multiple requirements of a driving environment, when the dark area 003 is adjusted, dazzling caused to vehicles outside a detection range of a vehicle camera due to the illumination range is larger than the detection range of the vehicle camera is avoided, and the safety of driving at night is further improved.

It should be noted that a "high-beam light shape" in the present disclosure refers to a light shape of the high-beam lighting device (including the main high-beam module 100 and the auxiliary high-beam module 200) projected onto a light distribution screen; a "main high-beam light shape" is a light shape located in a high-beam light shape central area to ensure illuminance of the high-beam light shape central area; an "auxiliary high-beam light shape" is a light shape located in a high-beam light shape widening area to ensure the illumination range of the high-beam light shape; the main high-beam light shape is overlapped with the auxiliary high-beam light shape to form a high-beam light shape, and a "full high-beam light shape" is a light shape formed by projection when all light sources of the main high-beam module and the auxiliary high-beam module are turned on, and is projected by a vehicle lamp when there is no vehicle or pedestrian on the opposite side or in front.

Figure 16:
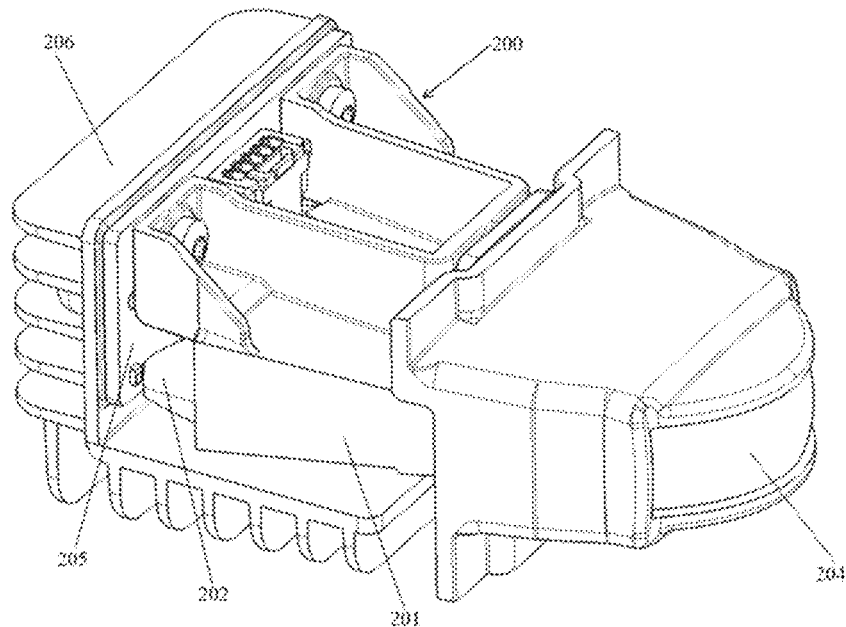
FIG. 16 shows a structural schematic diagram of an auxiliary high-beam module in a specific embodiment.
Figure 17:
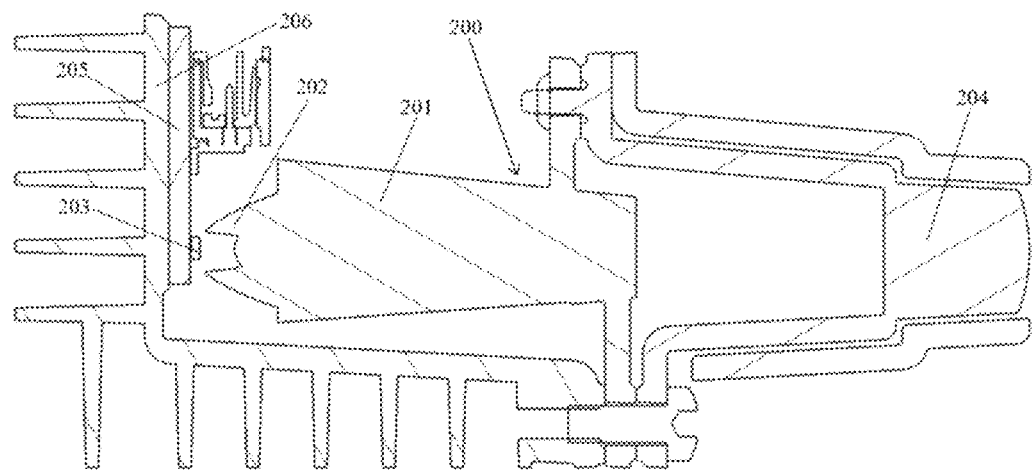
FIG. 17 shows a longitudinal sectional view of the auxiliary high-beam module shown in FIG. 16.
Figure 18:
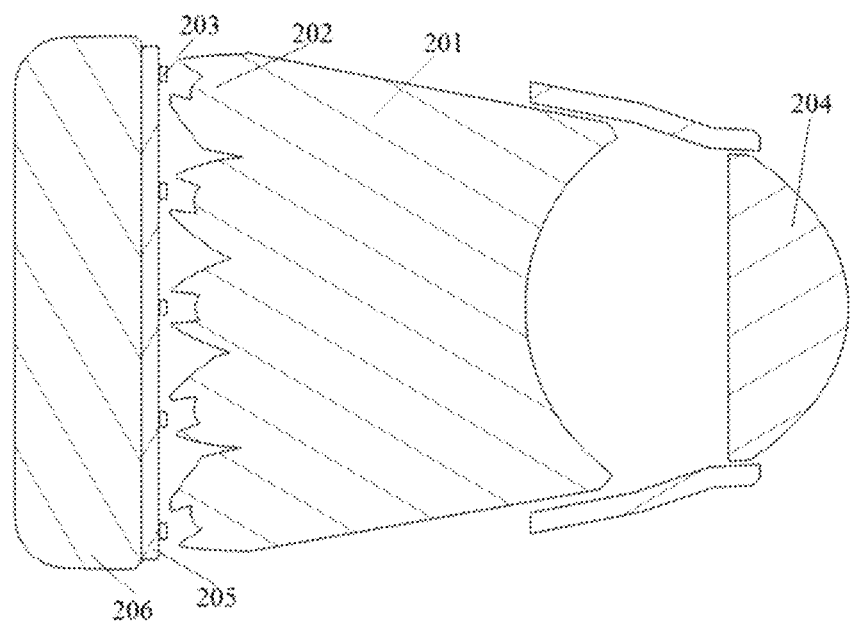
FIG. 18 shows a transverse sectional view of the auxiliary high-beam module shown in FIG. 16.
Figure 19:
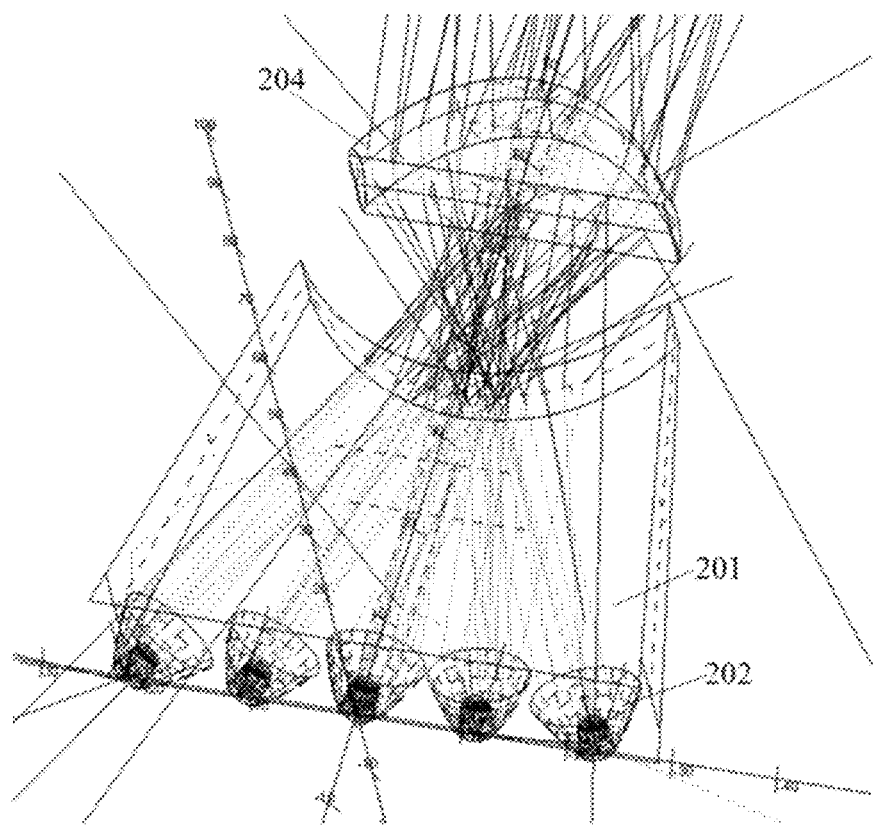
Figure 23:
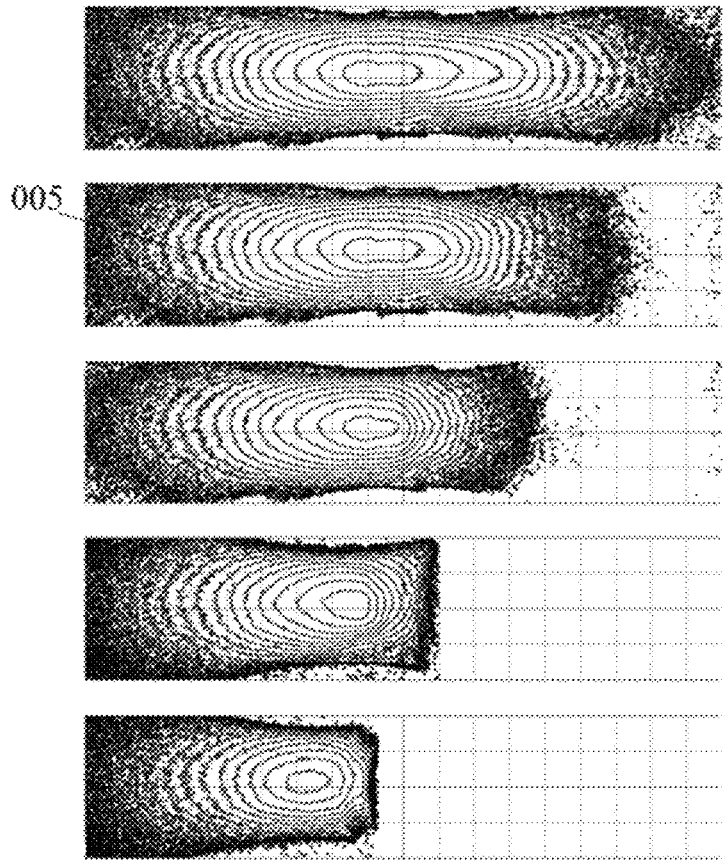
FIG. 23 shows light shape diagrams of an auxiliary high-beam module applied to a left vehicle lamp when auxiliary high-beam light sources are sequentially turned off from right to left.
Figure 24:
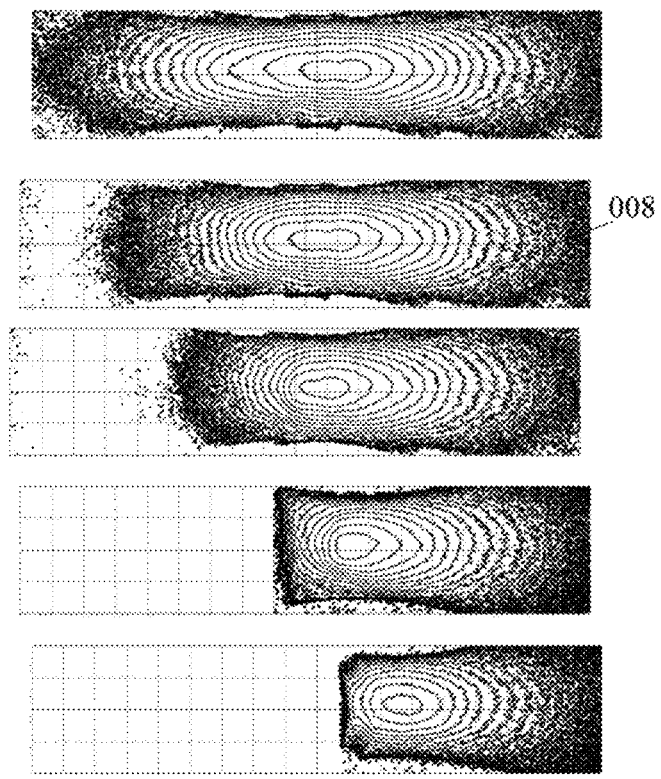
FIG. 24 shows light shape diagrams of an auxiliary high-beam module applied to a right vehicle lamp when auxiliary high-beam light sources are sequentially turned off from left to right.
Figure 25:
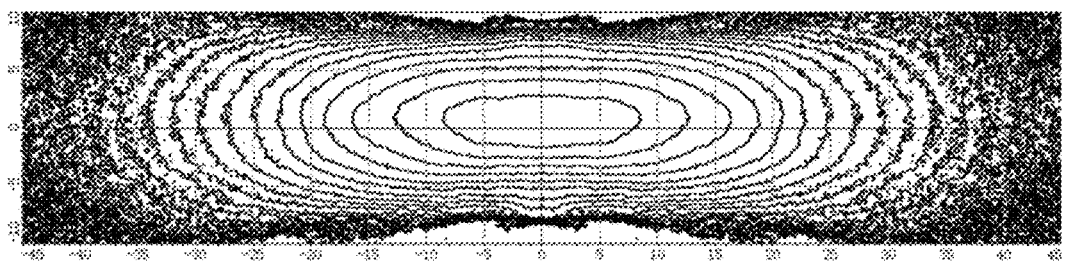
Figure 26:
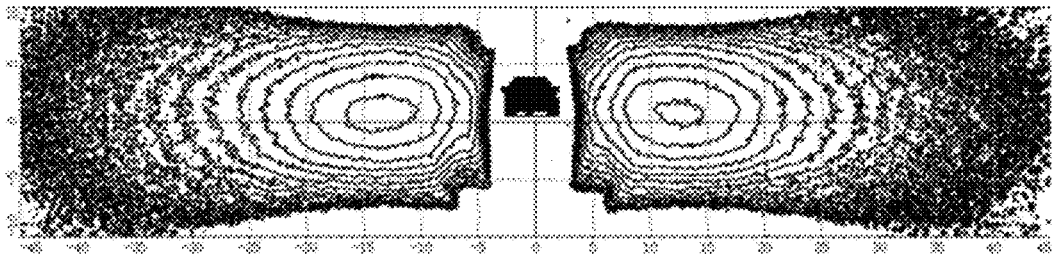
FIG. 26 shows a light shape diagram when auxiliary high-beam light sources corresponding to an area where a vehicle or pedestrian is located are turned off based on the light shape shown in FIG. 25.

According to a preferred specific structure of an auxiliary high-beam module 200 in the present disclosure, referring to FIGS. 16 to 18, the auxiliary high-beam module 200 includes an auxiliary primary optical element 201, auxiliary high-beam light sources 203, an auxiliary high-beam circuit board 205 and an auxiliary high-beam lens 204, wherein a light incident surface of the auxiliary primary optical element 201 is provided with multiple condensation structures 202, and the auxiliary high-beam light sources 203 are located on the auxiliary high-beam circuit board 205 and arranged in one-to-one correspondence to the condensation structures 202; each of the auxiliary high-beam light sources 203 can be turned on or off separately, and a light-emitting surface of the auxiliary primary optical element 201 faces the auxiliary high-beam lens 204. Wherein, the condensation structures 202 are sequentially arranged on the light incident surface of the auxiliary primary optical element 201 in the left-right direction and can also be arranged in a matrix with multiple rows and columns as required. Specifically, as shown in FIG. 18, the light incident surface of the auxiliary primary optical element 201 may be provided with five condensation structures 202 corresponding to five auxiliary high-beam light sources 203 respectively. When all the five auxiliary high-beam light sources 203 are turned on, a light path diagram shown in FIG. 19 is obtained. Due to the multiple condensation structures 202 and the corresponding auxiliary high-beam light sources 203, multiple auxiliary illumination areas sequentially connected in the left-right direction can be separately formed when the auxiliary high-beam module 200 is applied to the left vehicle lamp or the right vehicle lamp, and correspondingly a left vehicle lamp auxiliary high-beam light shape 005 or a right vehicle lamp auxiliary high-beam light shape 008 is formed; each of the auxiliary high-beam light sources 203 can be turned on or off separately so that the auxiliary illumination areas can be controlled to be turned on or off separately, and thus the light shape widening angles of the left vehicle lamp high-beam light shape 001 and the right vehicle lamp high-beam light shape 002 are adjusted. As shown in FIG. 23, the left vehicle lamp auxiliary high-beam light shapes 005 with different widths from top to bottom are formed when auxiliary illumination areas of the left vehicle lamp auxiliary high-beam light shape 005 are sequentially turned off from right to left; as shown in FIG. 24, the right vehicle lamp auxiliary high-beam light shapes 008 with different widths from top to bottom are formed when auxiliary illumination areas of the right vehicle lamp auxiliary high-beam light shape 008 are sequentially turned off from left to right; as shown in FIG. 25, a complete high-beam widening area light shape can be formed when all the auxiliary illumination areas of the left vehicle lamp auxiliary high-beam light shape 005 and the right vehicle lamp auxiliary high-beam light shape 008 are turned on; as shown in FIG. 26, when there is a vehicle or pedestrian on the opposite side or in front of this vehicle, auxiliary high-beam light sources 203 corresponding to the area where the vehicle or pedestrian is located are turned off to prevent dazzling from being caused to the vehicle or pedestrian.

Preferably, a light-emitting surface of the auxiliary primary optical element 201 is a concave curved surface which can be matched with a focal plane of the auxiliary high-beam lens 204, so that images of the auxiliary high-beam lens 204 are clearer.

More preferably, the side surface of the auxiliary high-beam lens 204 which is connected to a light-emitting surface of this auxiliary high-beam lens 204 is also provided with an auxiliary light-shielding cover, and the side, away from the auxiliary high-beam light sources 203, of the auxiliary high-beam circuit board 205 is provided with an auxiliary high-beam radiator 206. The auxiliary high-beam lens 204 and the auxiliary primary optical element 201, the auxiliary light-shielding cover and the auxiliary high-beam lens 204, and the auxiliary primary optical element 201 and the auxiliary high-beam radiator 206 may be connected by threaded connection, riveting, gluing, welding and the like. The auxiliary light-shielding cover can effectively prevent emergent light of the auxiliary primary optical element 201 from being emitted from the side surface of the auxiliary high-beam lens 204, so that the optical efficiency is improved; the auxiliary high-beam radiator 206 can prevent local high temperature from affecting the auxiliary high-beam light sources 203, and the stability of the auxiliary high-beam light sources 203 is kept.

Figure 15:
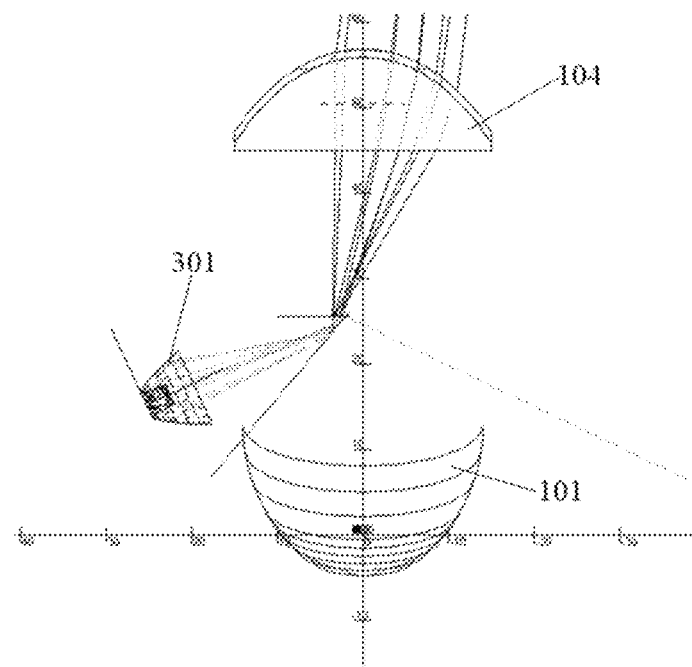
FIG. 15 shows a light path diagram of an auxiliary illumination module.
Figure 34:
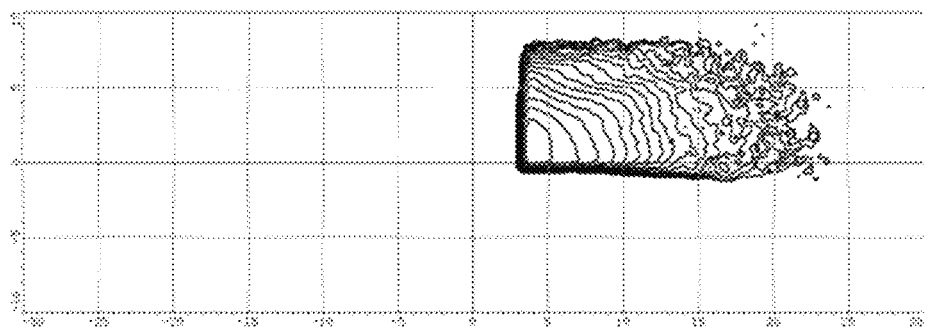
FIG. 34 shows a main high-beam supplementary light shape formed by an auxiliary illumination module.

According to a high-beam lighting device in another preferred embodiment of the present disclosure, referring to FIGS. 10 to 14, the main high-beam module 100 is further provided with an auxiliary illumination module 300, light emitted by the auxiliary illumination module 300 is projected by the main high-beam lens 104 to form a main high-beam supplementary light shape, and the main high-beam supplementary light shape is located in a light-free area on one side of the light and shade cut-off line of the main high-beam light shape. At this time, an additional auxiliary illumination module 300 with a light path diagram shown in FIG. 15 is turned on in a full high-beam mode without dark areas to form a main high-beam supplementary light shape as shown in FIG. 34, so that a light-free area on the right side of the left vehicle lamp light and shade cut-off line 006 of the left vehicle lamp main high-beam light shape 004 as shown in FIG. 20 can be filled up, a deficiency of the main high-beam light shape formed by the main high-beam module 100 when there is no vehicle or pedestrian on the opposite side or in front of an own vehicle is made up for, the high-beam illumination effect is effectively improved, dazzling is prevented, and at the same time, it is ensured that the high-beam light shape meets requirements of high-beam illumination when dazzling prevention is not needed. A main high-beam supplementary light shape may be located in a light-free area on one side of a light and shade cut-off line of a main high-beam light shape. Preferably, the edge of the main high-beam supplementary light shape can be overlapped with the light and shade cut-off line to supplement the main high-beam light shape more completely.

When the shading structure 2 is used to form an L-shaped left vehicle lamp light and shade cut-off line 006 or an inverted L-shaped right vehicle lamp light and shade cut-off line 009, the auxiliary illumination module 300 in the left vehicle lamp is designed to form a left main high-beam supplementary light shape with an L-shaped light shape edge in a light-free area on the right side of the left vehicle lamp light and shade cut-off line 006, and the auxiliary illumination module 300 in the right vehicle lamp is designed to form a right main high-beam supplementary light shape with an inverted L-shaped light shape edge in a light-free area on the left side of the right vehicle lamp light and shade cut-off line 009.

Figure 10:
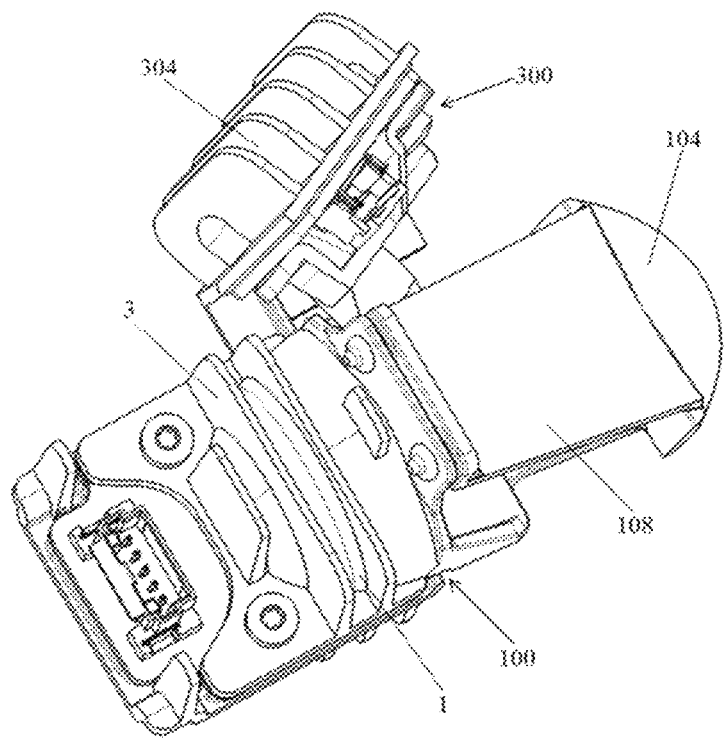
FIG. 10 shows a structural schematic diagram of a main high-beam module and an auxiliary illumination module in a specific embodiment.
Figure 11:
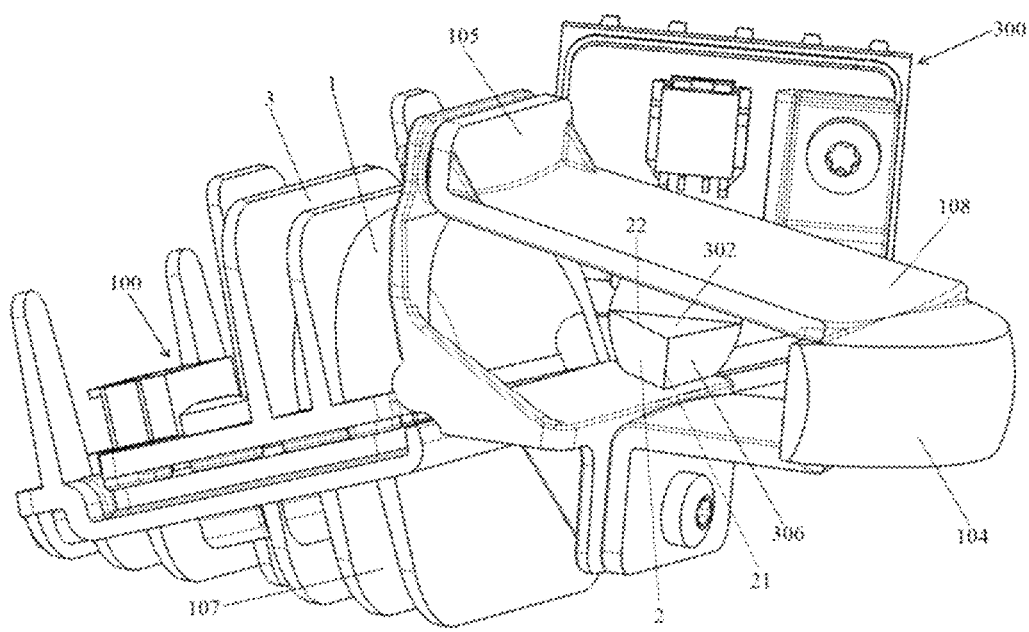
FIG. 11 shows a structural schematic diagram of the main high-beam module and the auxiliary illumination module shown in FIG. 10 from another viewing angle.
Figure 12:
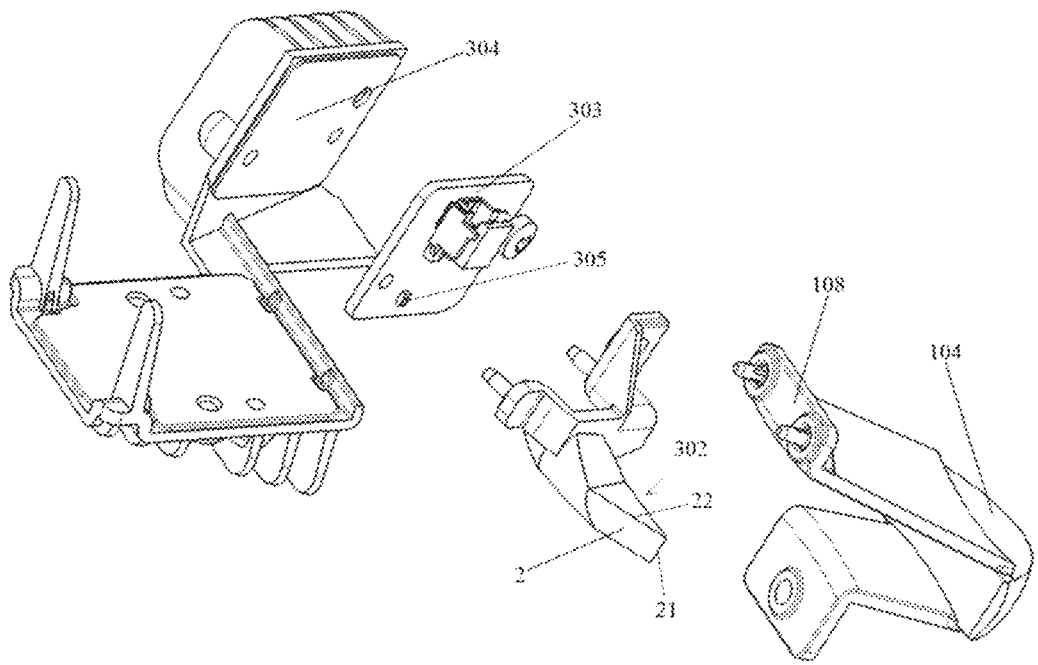
FIG. 12 is a parts diagram of an auxiliary illumination module in a specific embodiment.
Figure 13:
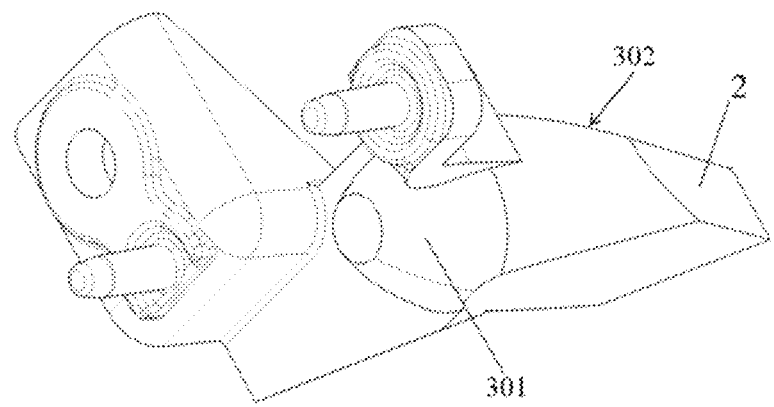
FIG. 13 shows the first structural schematic diagram of an auxiliary illumination primary optical element in a specific embodiment.
Figure 14:
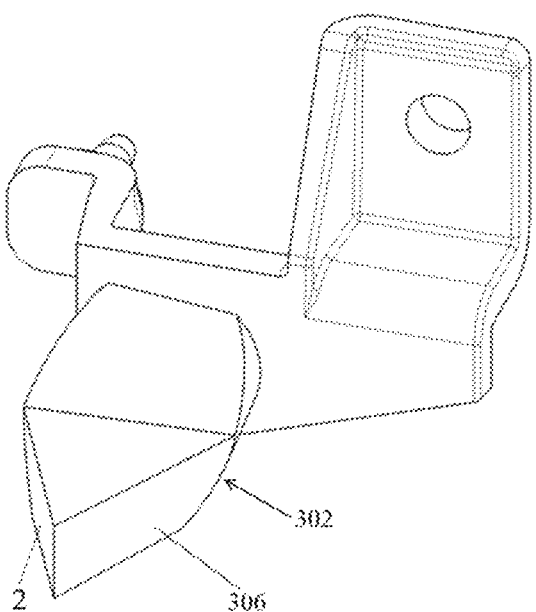
FIG. 14 shows the second structural schematic diagram of an auxiliary illumination primary optical element in a specific embodiment.

According to a preferred specific structure of an auxiliary illumination module 300 in the present disclosure, referring to FIGS. 10 to 12, the auxiliary illumination module 300 includes an auxiliary illumination primary optical element 302, auxiliary illumination sources 305 and an auxiliary illumination circuit board 303, a light incident surface of the auxiliary illumination primary optical element 302 is provided with at least one auxiliary condensation structure 301, and the auxiliary illumination sources 305 are located on the auxiliary illumination circuit board 303 and arranged in one-to-one correspondence to the auxiliary condensation structures 301, wherein the auxiliary illumination primary optical element 302 is provided with an auxiliary light-emitting surface 306 facing the main high-beam lens 104, and light emitted by the auxiliary illumination sources 305 is transmitted through the auxiliary illumination primary optical element 302, emitted to the main high-beam lens 104 through the auxiliary light-emitting surface 306 and then projected by the main high-beam lens 104 to form the main high-beam supplementary light shape.

Further preferably, the side, away from the auxiliary illumination sources 305, of the auxiliary illumination circuit board 303 is provided with an auxiliary illumination radiator 304, so that quick dissipation of heat generated by the auxiliary illumination sources 305 is facilitated, influence caused to the auxiliary illumination sources 305 and the auxiliary illumination circuit board 303 when the local temperature is too high is avoided, and the stability of the auxiliary illumination sources 305 is kept.

According to the high-beam lighting device provided in the present disclosure, the shading structure 2 may be arranged or integrally formed on the reflection unit 1, and two functions of reflecting light emitted by the main high-beam light source 103 and shielding part of reflected light of the reflection unit 1 are integrated, so that components in the main high-beam module 100 are simple in structure and compact in design. Preferably, the reflection unit 1 is provided with a heat sink 3, so that dissipation of heat in the main primary optical element 101 is facilitated, local temperature of the main primary optical element 101 is prevented from being too high, and it is ensured that emergent light shape of the main primary optical element 101 is stable and precise.

Under a condition that the auxiliary illumination module 300 is arranged in the high-beam lighting device, the auxiliary illumination primary optical element 302 is located between the main primary optical element 101 and the main high-beam lens 104, and the shading structure 2 is arranged or integrally formed on the auxiliary illumination primary optical element 302. At this time, the shading structure 2 is skillfully combined with the auxiliary illumination primary optical element 302. Specifically, as shown in FIGS. 10 to 14, the surface, facing the reflection unit 1, of the auxiliary illumination primary optical element 302 is used as the shading structure 2, and the surface facing the main high-beam lens 104 is used as the auxiliary light-emitting surface 306. The shading structure 2 can be used for preventing reflected light of the reflection unit 1 from entering into the auxiliary illumination primary optical element 302, so that when the auxiliary illumination sources 305 are turned off, the main high-beam module 100 is combined with the auxiliary illumination module 300 to form a main high-beam light shape with a light and shade cut-off line. The shading structure 2 and the auxiliary light-emitting surface 306 are in a V shape. At this time, the edge of a main high-beam supplementary light shaped formed by the auxiliary light-emitting surface 306 when the auxiliary illumination sources 305 are turned on can be better overlapped with a light and shade cut-off line formed by the shading structure 2 when the auxiliary illumination sources 305 are turned off, and a supplementary effect on a main high-beam light shape is better. At the same time, separate arrangement of the shading structure 2 in the main high-beam module 100 is avoided, so that the structure of the main high-beam module 100 is simple, and the space utilization rate is high.

In the present disclosure, the main high-beam light source 103, the auxiliary high-beam light sources 203 and the auxiliary illumination sources 305 may be laser light sources, LED light sources or other illumination sources for vehicle lamps. Preferably, the main high-beam light source 103, the auxiliary illumination sources 305 and the auxiliary high-beam light sources 203 are laser light sources. The luminous flux of a laser light source per unit area is about 1200 lm/mm$^2$, light shape brightness requirements of laws and regulations can be met by a single laser light source, and the light-emitting area is small. When the main high-beam light source 103 is a laser light source, the size of the reflection unit 1 corresponding thereto is reduced, and the focal length may be 10-20 mm, preferably 10 mm. Correspondingly, the size of the main high-beam lens 104 may also be reduced to 5-15 mm in vertical height and 20-40 mm in width, preferably 10 mm in vertical height and 30 mm in width. In order to make light reflected by the reflection unit 1 be incident to the main high-beam lens 104 as much as possible, the focal length of the main high-beam lens 104 is correspondingly reduced to 10-30 mm. Therefore, the length in the front-back direction, the width in the left-right direction and the height in the up-down direction of the entire high-beam lighting device can be significantly reduced and specifically designed to be 60-90 mm long, 22-42 mm wide and 20-50 mm high respectively, preferably 80 mm long, 32 mm long and 40 mm long respectively. At this time, the volume of the high-beam lighting device is greatly reduced, and the high-beam lighting device can be designed into a miniature vehicle lamp module.

In addition, it should be noted that the auxiliary primary optical element 201 and the auxiliary illumination primary optical element 302 are both transparent light conductors for light transmission.

On the basis of the primary optical structure and the high-beam lighting device in the present disclosure, a third aspect of the present disclosure is to provide an anti-glare high-beam lamp. The anti-glare high-beam lamp includes a left vehicle lamp and a right vehicle lamp, wherein the left vehicle lamp and the right vehicle lamp are each provided with the high-beam lighting device according to any one above, the left vehicle lamp can form a left vehicle lamp main high-beam light shape 004 with a left vehicle lamp light and shade cut-off line 006, the right vehicle lamp can form a right vehicle lamp main high-beam light shape 007 with a right vehicle lamp light and shade cut-off line 009, and a high-beam central area light shape with a dark area 003 can be formed after the left vehicle lamp main high-beam light shape 004 is overlapped with the right vehicle lamp main high-beam light shape 007, wherein the dark area 003 is located between the left vehicle lamp light and shade cut-off line 006 and the right vehicle lamp light and shade cut-off line 009, and the left vehicle lamp main high-beam light shape 004 and/or the right vehicle lamp main high-beam light shape 007 can move left and right to adjust the width and position of the dark area 003.

According to the anti-glare high-beam lamp of the present disclosure, the high-beam lighting device of the left vehicle lamp and the high-beam lighting device of the right vehicle lamp can be designed to be able to move left and right respectively, or one of the two can move left and right so that the width and position of the dark area 003 can be adjusted by moving the high-beam lighting device of the left vehicle lamp left and right alone or moving the high-beam lighting device of the right vehicle lamp left and right alone or moving the high-beam lighting device of the left vehicle lamp and the high-beam lighting device of the right vehicle lamp left and right at the same time.

According to an anti-glare high-beam lamp in a preferred embodiment of the present disclosure, the left vehicle lamp and the right vehicle lamp are each provided with the high-beam lighting device including the auxiliary high-beam module, the left vehicle lamp can form the left vehicle lamp main high-beam light shape 004 and the left vehicle lamp auxiliary high-beam light shape 005 adjustable in widening angle, and the right vehicle lamp can form the right vehicle lamp main high-beam light shape 007 and the right vehicle lamp auxiliary high-beam light shape 008 adjustable in widening angle; the left vehicle lamp main high-beam light shape 004 is overlapped with the left vehicle lamp auxiliary high-beam light shape 005 to form a left vehicle lamp high-beam light shape 001 with the left vehicle lamp light and shade cut-off line 006 and adjustable in light shape widening angle, the right vehicle lamp main high-beam light shape 007 is overlapped with the right vehicle lamp auxiliary high-beam light shape 008 to form a right vehicle lamp high-beam light shape 002 with the right vehicle lamp light and shade cut-off line 009 and adjustable in light shape widening angle, and the left vehicle lamp high-beam light shape 001 is overlapped with the right vehicle lamp high-beam light shape 002 to form a high-beam light shape with a dark area 003 and adjustable in light shape widening angle.

At this time, not only can the light shape widening angles of the left vehicle lamp high-beam light shape 001 formed by the left vehicle lamp and the right vehicle lamp high-beam light shape 002 formed by the right vehicle lamp be adjusted separately, but also a high-beam light shape with a dark area 003 can be formed after the two light shapes are overlapped. During use, the dark area 003 is adjusted to an appropriate width and position by moving the left vehicle lamp high-beam light shape 001 and/or the right vehicle lamp high-beam light shape 002 left and right according to the position of a vehicle on the opposite side or in front to prevent dazzling caused to a driver of the vehicle on the opposite side or in front; at the same time, the light shape widening angles of the left vehicle lamp high-beam light shape 001 and the right vehicle lamp high-beam light shape 002 are adaptively adjusted to meet multiple requirements of a driving environment, dazzling caused to vehicles outside a detection range of a vehicle camera when the dark area 003 is adjusted is avoided, and the safety of driving at night is further improved.

Preferably, the left vehicle lamp and the right vehicle lamp each include a driving mechanism for driving the high-beam lighting device to move left and right. In the present disclosure, the driving mechanism is not particularly limited. Preferably, an AFS rotating mechanism (Adaptive Front-Lighting System rotating mechanism, namely an adaptive automobile headlamp system rotating mechanism) is adopted as the driving mechanism, and the patent CN207049828U can be used as a reference to a structure of the AFS rotating mechanism. Of course, other structural forms of AFS rotating mechanisms can also be used as the driving mechanism of the present disclosure. It should be noted that as another achievable way, the AFS rotating mechanism can also be used for only driving the corresponding main high-beam module 100 to move the left vehicle lamp main high-beam light shape 004 and the right vehicle lamp main high-beam light shape 007 left and right, and the auxiliary high-beam module 200 only needs to be matched with the position of the left vehicle lamp main high-beam light shape 004 and the right vehicle lamp main high-beam light shape 007 to control corresponding auxiliary illumination areas to be turned on or off so that dark areas 003 different in width and position can be obtained.

Figure 36:
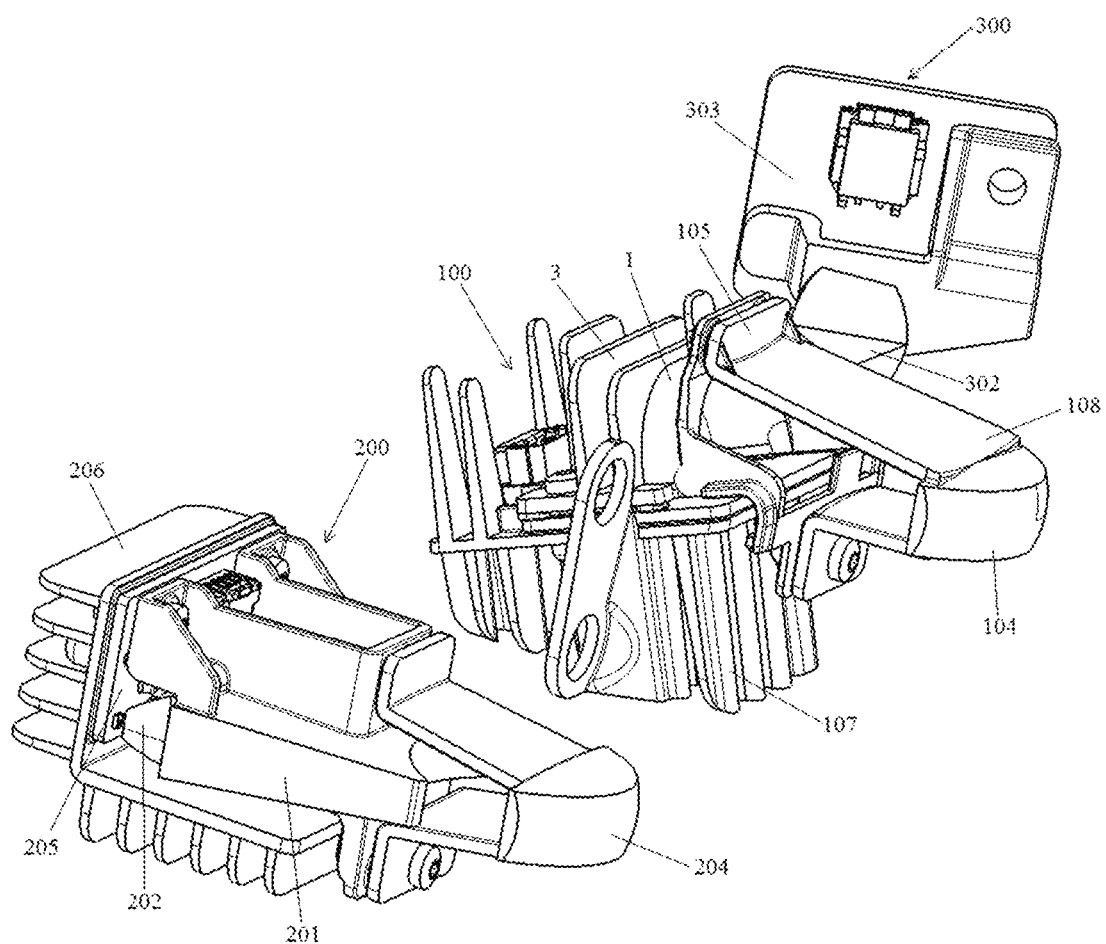
FIG. 36 shows a structural schematic diagram of a main high-beam module, an auxiliary high-beam module and an auxiliary illumination module in a specific embodiment.

According to an anti-glare high-beam lamp in a preferred embodiment of the present disclosure, the anti-glare high-beam lamp includes a left vehicle lamp and a right vehicle lamp. Referring to FIG. 36, the left vehicle lamp and the right vehicle lamp are each provided with a main high-beam module 100, an auxiliary high-beam module 200, an auxiliary illumination module 300 and a driving mechanism for driving a high-beam lighting device to move left and right. The main high-beam module 100 includes a main primary optical element 101, a main high-beam circuit board 102, a main high-beam lens 104 and a main high-beam light source 103 arranged on the main high-beam circuit board 102. The main primary optical element 101 includes a reflection unit 1, and the reflection unit 1 is provided with a heat sink 3. The main high-beam circuit board 102 and the main high-beam lens 104 are connected to the main primary optical element 101, and the main high-beam lens 104 and the main primary optical element 101 are connected by a main high-beam lens connecting part 105 and a main primary optical element connecting part 106, and the side, away from the main high-beam light source 103, of the main high-beam circuit board 102 is provided with a main high-beam radiator 107; the auxiliary high-beam module 200 includes an auxiliary primary optical element 201, auxiliary high-beam light sources 203, an auxiliary high-beam circuit board 205 and an auxiliary high-beam lens 204, a light incident surface of the auxiliary primary optical element 201 is provided with multiple condensation structures 202, and the auxiliary high-beam light sources 203 are located on the auxiliary high-beam circuit board 205 and arranged in one-to-one correspondence to the condensation structures 202; each of the auxiliary high-beam light sources 203 can be turned on or off separately, a light-emitting surface of the auxiliary primary optical element 201 faces the auxiliary high-beam lens 204 and is a concave curved surface which can be matched with a focal plane of the auxiliary high-beam lens 204; the side, away from the auxiliary high-beam light sources 203, of the auxiliary high-beam circuit board 205 is provided with an auxiliary high-beam radiator 206, and the side surfaces connected to the light-emitting surfaces of the main high-beam lens 104 and the auxiliary high-beam lens 204 are each provided with a light-shielding cover; the auxiliary illumination module 300 includes an auxiliary illumination primary optical element 302, an auxiliary illumination source 305 and an auxiliary illumination circuit board 303, a light incident surface of the auxiliary illumination primary optical element 302 is provided with one auxiliary condensation structure 301, the auxiliary illumination source 305 is located on the auxiliary illumination circuit board 303 and arranged in correspondence to the auxiliary condensation structure 301, the auxiliary illumination primary optical element 302 is located between the main primary optical element 101 and the main high-beam lens 104, the surface, facing the reflection unit 1, of the auxiliary illumination primary optical element 302 is used as a shading structure 2, and the surface facing the main high-beam lens 104 is an auxiliary light-emitting surface 306 corresponding to the shading structure 2; the light shielded by the shading structure 2 of the left vehicle lamp and the light not shielded of the left vehicle lamp are bounded by a right side edge 21 and an upper side edge 22 of the shading structure 2, so that the left vehicle lamp forms a left vehicle lamp main high-beam light shape 004 with an L-shaped left vehicle lamp light and shade cut-off line 006; the light shielded by the shading structure 2 of the right vehicle lamp and the light not shielded of the right vehicle lamp are bounded by a left side edge 23 and an upper side edge 22 of the shading structure 2, so that the right vehicle lamp forms a right vehicle lamp main high-beam light shape 007 with an inverted L-shaped right vehicle lamp light and shade cut-off line 009.

Figure 27:
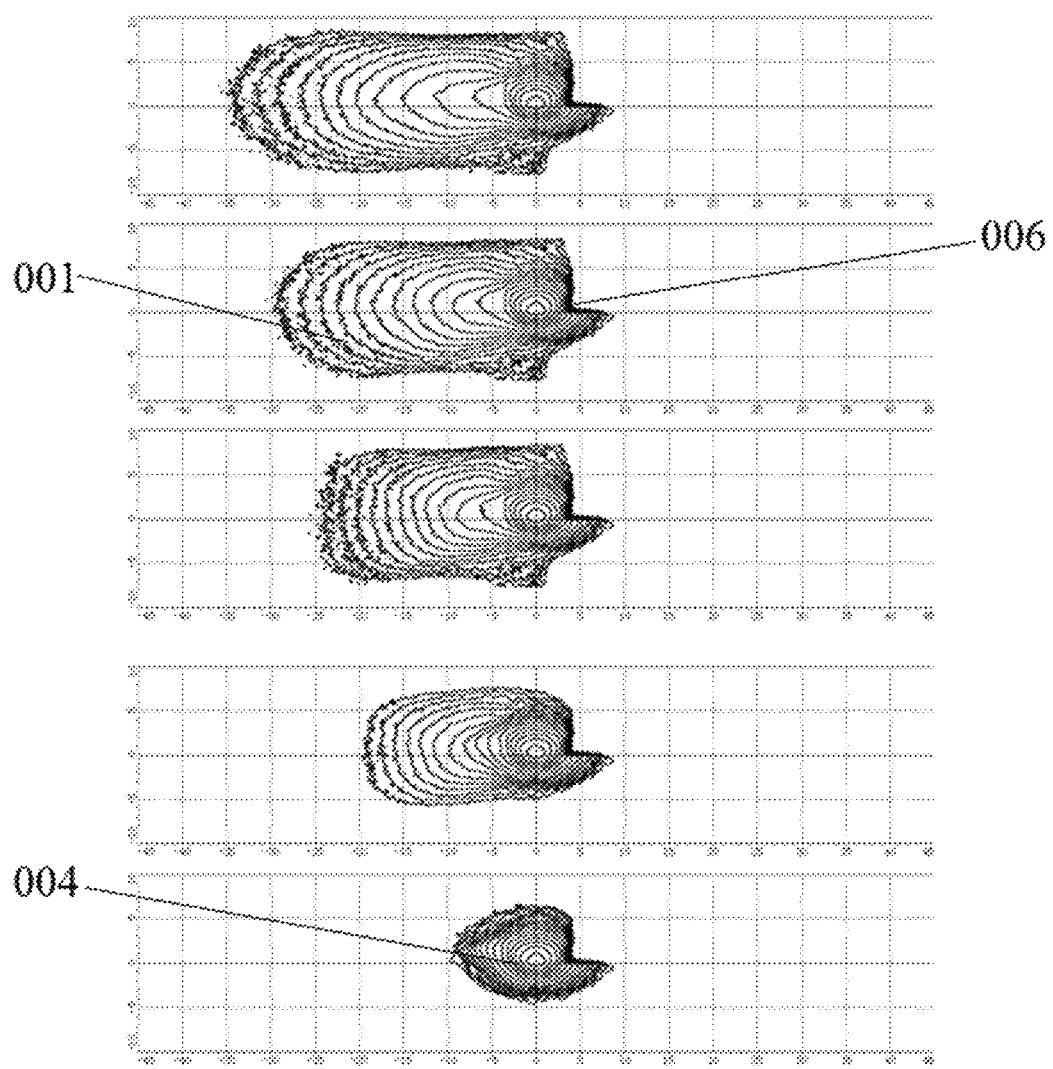
FIG. 27 shows a left vehicle lamp high-beam light shape formed after a left vehicle lamp main high-beam light shape is overlapped with a left vehicle lamp auxiliary high-beam light shape with different light shape widening angles.
Figure 28:
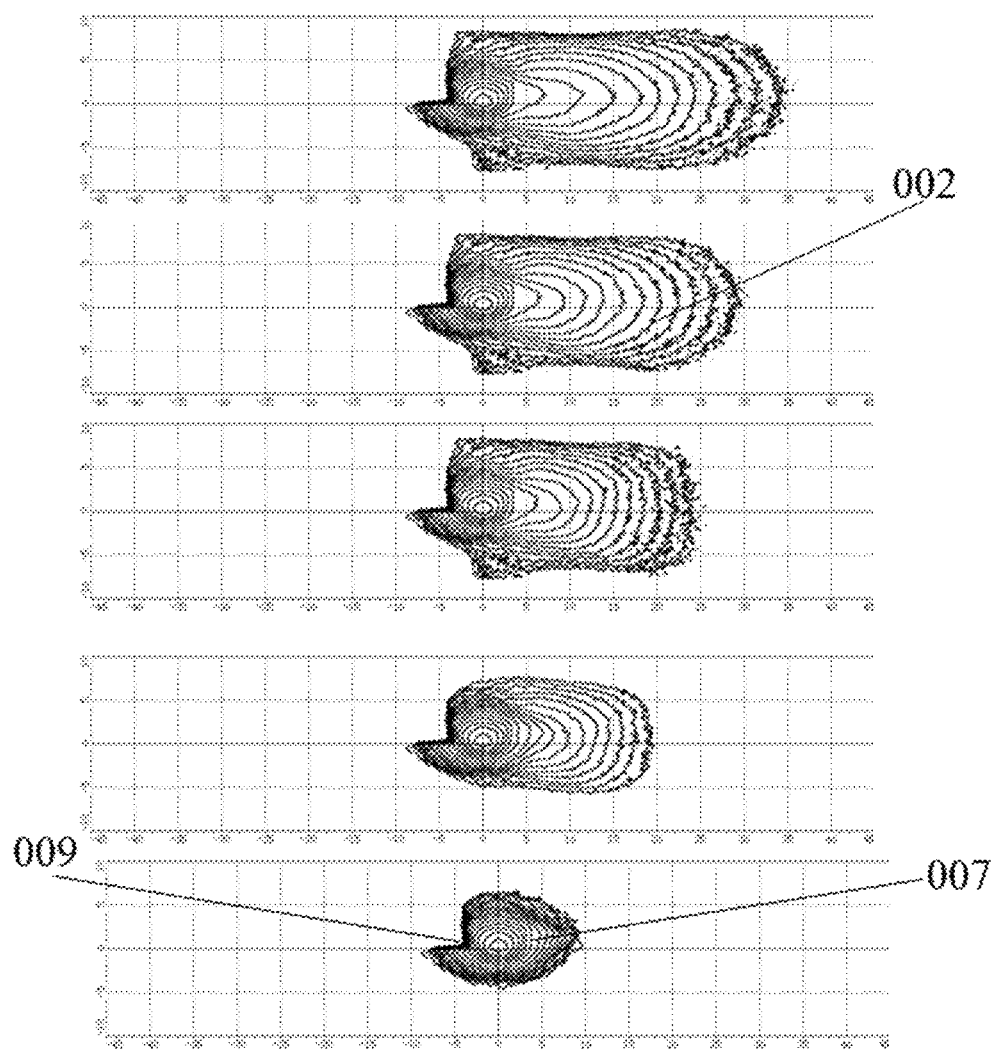
FIG. 28 shows a right vehicle lamp high-beam light shape formed after a right vehicle lamp main high-beam light shape is overlapped with a right vehicle lamp auxiliary high-beam light shape with different light shape widening angles.
Figure 29:
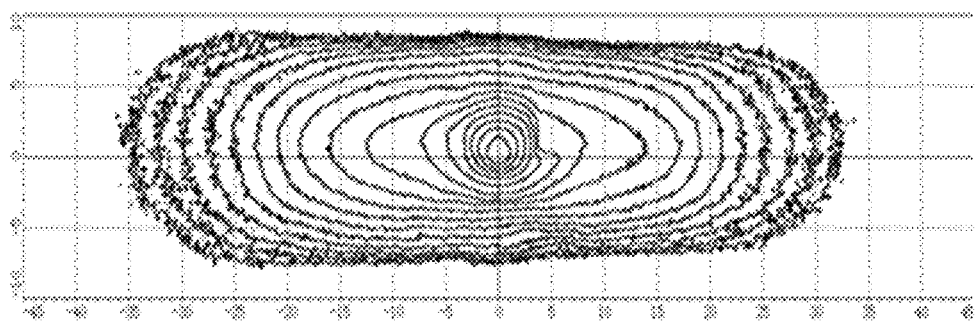
Figure 30:
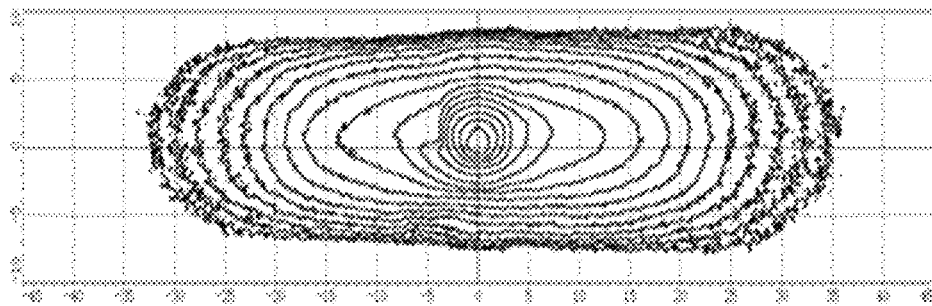
Figure 31:
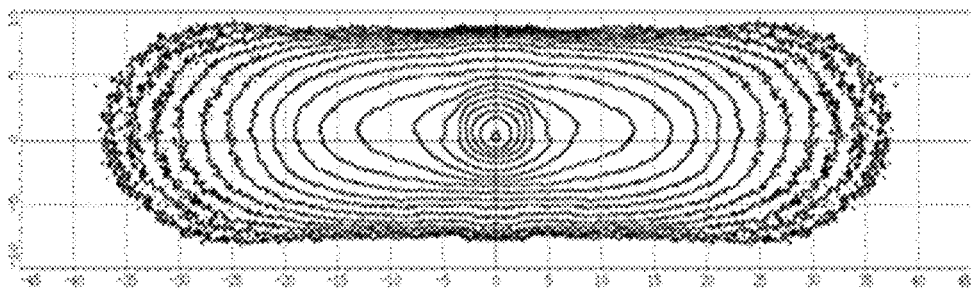
FIG. 31 shows a full high-beam light shape formed after a left vehicle lamp full high-beam light shape is overlapped with a right vehicle lamp full high-beam light shape.
Figure 32:
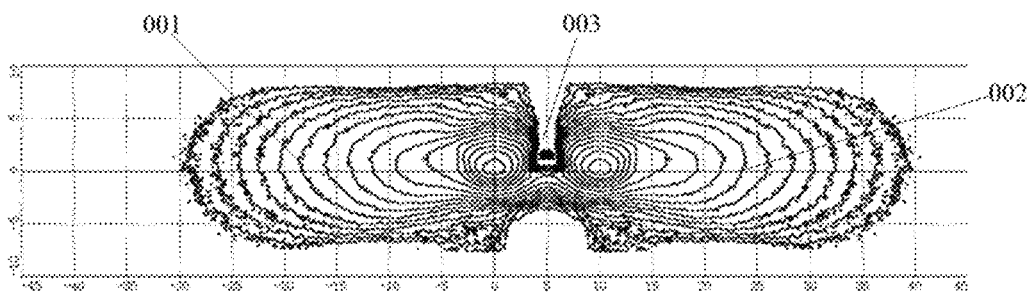
FIG. 32 shows a schematic diagram of a vehicle on the opposite side or in front located in a dark area of a high-beam light shape in a specific embodiment.
Figure 33:
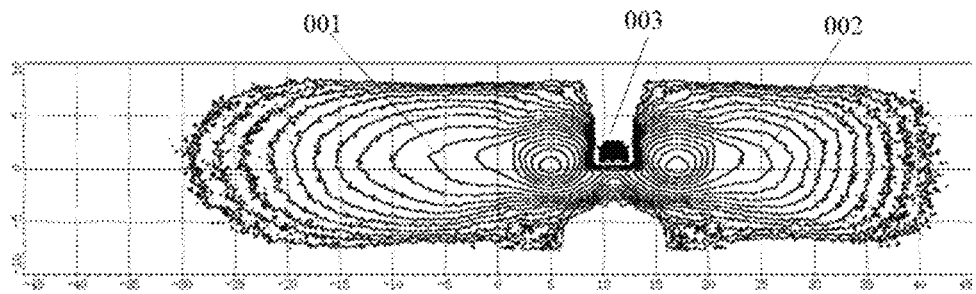
FIG. 33 shows a schematic diagram of a vehicle on the opposite side or in front located in a dark area of a high-beam light shape in another specific embodiment.
Figure 35:
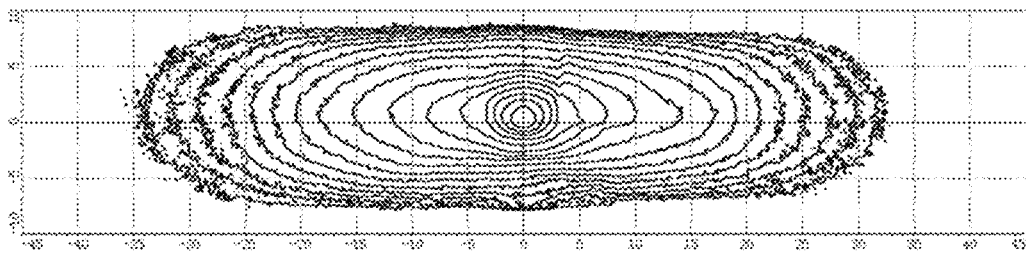
FIG. 35 shows a full high-beam light shape formed by a main high-beam module, an auxiliary high-beam module and an auxiliary illumination module.

According to the above embodiments of the vehicle lamp, at this time, if the main high-beam light source 103 and all the auxiliary high-beam light sources 203 in the left vehicle lamp are turned on and light sources in part of auxiliary illumination areas of the auxiliary high-beam module 200 in the left vehicle lamp are turned off as required, a left vehicle lamp high-beam light shape 001 with different light shape widening angles and an L-shaped left vehicle lamp light and shade cut-off line 006 as shown in FIG. 27 can be formed; if the main high-beam light source 103 and all the auxiliary high-beam light sources 203 in the right vehicle lamp are turned on and light sources in part of auxiliary illumination areas of the auxiliary high-beam module 200 in the right vehicle lamp are turned off as required, a right vehicle lamp high-beam light shape 002 with different light shape widening angles and an inverted L-shaped right vehicle lamp light and shade cut-off line 009 as shown in FIG. 28 can be formed; if the main high-beam light source 103 in the left vehicle lamp and all the auxiliary high-beam light sources 203 in the left vehicle lamp and the right vehicle lamp are turned on at the same time, a left vehicle lamp full high-beam light shape as shown in FIG. 29 can be formed; if the main high-beam light source 103 in the right vehicle lamp and all the auxiliary high-beam light sources 203 in the left vehicle lamp and the right vehicle lamp are turned on at the same time, a right vehicle lamp full high-beam light shape as shown in FIG. 30 can be formed; if the main high-beam light source 103 and all the auxiliary high-beam light sources 203 in the left vehicle lamp and the main high-beam light source 103 and all the auxiliary high-beam light sources 203 in the right vehicle lamp are turned on at the same time, a full high-beam light shape as shown in FIG. 31 can be formed. During driving at night, according to different driving conditions, positions of the high-beam lighting devices in the left and right vehicle lamps are adjusted by using the driving mechanism to adjust the width and position of a dark area 003 in a high-beam light shape with the dark area 003, so that a vehicle on the opposite side or in front is located in the dark area 003; at the same time, the auxiliary high-beam light sources 203 corresponding to auxiliary illumination areas of the auxiliary high-beam modules 200 in the left and right vehicle lamps are separately controlled to be turned on or off, so that a left vehicle lamp auxiliary high-beam light shape 005 and a right vehicle lamp auxiliary high-beam light shape 008 have adaptive light shape widening angles and are matched with a formed main high-beam light shape to form high-beam light shapes required for driving as shown in FIG. 32 and FIG. 33. Further, referring to FIGS. 29 to 31 continuously, since a light-free area is correspondingly formed by the shading structure 2, the illuminance value of a light shape area (illuminance contour line is L-shaped) where the light-free area is located is low when a main high-beam light shape is overlapped with an auxiliary high-beam light shape (all the auxiliary high-beam light sources 203 are turned on), the light shape illuminance of this area are not uniform, and thus the light shape effect is unsatisfactory; at this time, a light shape defect caused by the light-free area is overcome by using an auxiliary illumination function of the auxiliary illumination module 300; specifically, the auxiliary illumination sources 305 are turned on, a left main high-beam supplementary light shape as shown in FIG. 34 is formed by the auxiliary illumination module 300 in the left vehicle lamp, a corresponding right main high-beam supplementary light shape is formed by the auxiliary illumination module 300 in the right vehicle lamp, the left main high-beam supplementary light shape and the right main high-beam supplementary light shape are matched with a left vehicle lamp high-beam light shape and a right vehicle lamp high-beam light shape, and a full high-beam light shape with uniform light shape illuminance as shown in FIG. 35 can be formed. In summary, the width and position of the dark area 003 formed by the left and right vehicle lamps in the present disclosure can be adjusted. The widening angles of high-beam light shapes are basically the same when the width and position of the dark area 003 are adjusted, and the situation cannot be caused that the driving safety of this vehicle driver is affected when the illumination range is too small or dazzling is caused to vehicles outside a detection range of a vehicle camera when the illumination range is too large. At the same time, due to a main high-beam supplementary light shape formed by the auxiliary illumination module 300, the illumination effect of high-beam light shapes is further improved, defects caused by a light-free area formed by the shading structure 2 to the high-beam light shapes are made up for, and the safety of driving at night is effectively improved.

A fourth aspect of the present disclosure is to provide a vehicle including the anti-glare high-beam lamp according to any one above. Therefore, at least all beneficial effects brought by the technical solutions of embodiments of the primary optical structure, the high-beam lighting device and the anti-glare high-beam lamp are achieved.

It can be seen from the description above that the shading structure 2 of the primary optical structure of the present disclosure can shield part of reflected light from the reflection unit 1, so that when the primary optical structure is applied to the left vehicle lamp and the right vehicle lamp, the left vehicle lamp and the right vehicle lamp can respectively form the left vehicle lamp main high-beam light shape 004 with the left vehicle lamp light and shade cut-off line 006 and the right vehicle lamp main high-beam light shape 007 with the right vehicle lamp light and shade cut-off line 009, and then the left vehicle lamp main high-beam light shape 004 is overlapped with the right vehicle lamp main high-beam light shape 007 to form a high-beam light shape with a dark area 003. When high beams of the vehicle lamps are used and there is a vehicle or pedestrian on the opposite side or in front, there is no light in the dark area 003 to prevent dazzling caused to a driver of the vehicle or pedestrian on the opposite side or in front. In the present disclosure, when the high-beam lighting device based on the primary optical structure is applied to the left vehicle lamp and the right vehicle lamp, the high-beam lighting device can move left and right by using the driving mechanism, so that the high-beam lighting device of the left vehicle lamp cooperates with the high-beam lighting device of the right vehicle lamp to move left and right to adjust the width and position of the dark area 003 to meet more illumination requirements of a driving environment, and the applicability of the vehicle lamps is improved.

The preferred embodiments of the present disclosure are described in detail with reference to the accompanying drawings, but not intended to limit the present disclosure. Various simple modifications can be made to the technical solutions of the present disclosure within the technical concept scope of the present disclosure, including combinations of various specific technical features in any suitable manner to avoid unnecessary repetition, and various possible combination manners are not further explained in the present disclosure. However, these simple modifications and combinations should also be regarded as contents disclosed in the present disclosure, and belong to the protection scope of the present disclosure.

The invention claimed is:

1. A high-beam lighting device, applied to a left vehicle lamp and a right vehicle lamp, wherein the high-beam lighting device comprises: a main high-beam module and an auxiliary high-beam module, the main high-beam module comprises a primary optical structure, and the primary optical structure enables the main high-beam module to form a main high-beam light shape with a light and shade cut-off line; the auxiliary high-beam module forms an auxiliary high-beam light shape adjustable in widening angle; and the main high-beam light shape is overlapped with the auxiliary high-beam light shape to form a high-beam light shape with the light and shade cut-off line and adjustable in light shape widening angle;

the primary optical structure comprises: a reflection unit and a shading structure located in front of the reflection unit, the shading structure blocks part of reflected light from the reflection unit, and the primary optical structure is configured to be one of the following two structures:

where the primary optical structure is for use in the left vehicle lamp, the shading structure is arranged at the left side portion of an optical axis in front of the reflection unit, and the reflected light blocked by the shading structure and the reflected light that is not blocked are bound by a right side edge and an upper side edge of the shading structure, to make, and locate, the light and shade cut-off line on the right side of the main high-beam light shape; and where the primary optical structure is for use in the right vehicle lamp, the shading structure is arranged at the right side portion of the optical axis in front of the reflection unit, and the reflected light blocked by the shading structure and the reflected light that is not blocked are bound by a left side edge and the upper side edge of the shading structure, to make, and locate, the light and shade cut-off line on the left side of the main high-beam light shape.

2. The high-beam lighting device according to claim 1, wherein the reflection unit is provided with a heat sink.

3. The high-beam lighting device according to claim 1, wherein the auxiliary high-beam module comprises an auxiliary primary optical element, auxiliary high-beam light sources, an auxiliary high-beam circuit board and an auxiliary high-beam lens, a light incident surface of the auxiliary primary optical element is provided with multiple condensation structures, and the auxiliary high-beam light sources are located on the auxiliary high-beam circuit board and arranged in one-to-one correspondence to the condensation structures; each of the auxiliary high-beam light sources is turned on or off separately, and a light-emitting surface of the auxiliary primary optical element faces the auxiliary high-beam lens.

4. The high-beam lighting device according to claim 1, wherein where the primary optical structure is for use in the left vehicle lamp, the right side edge and the upper side edge of the shading structure are perpendicular to each other; where the primary optical structure is for use in the right vehicle lamp, the left side edge and the upper side edge of the shading structure are perpendicular to each other.

5. The high-beam lighting device according to claim 4, wherein the shading structure is a rectangular light-shielding plate.

6. An anti-glare high-beam lamp, comprising: a left vehicle lamp and a right vehicle lamp, wherein the left vehicle lamp and the right vehicle lamp are each provided with the high-beam lighting device according to claim 1, the left vehicle lamp forms a left vehicle lamp main high-beam light shape with a left vehicle lamp light and shade cut-off line, the right vehicle lamp forms a right vehicle lamp main high-beam light shape with a right vehicle lamp light and shade cut-off line, and the left vehicle lamp main high-beam light shape overlaps with the right vehicle lamp main high-beam light shape to form a high-beam central area light shape with a dark area;

the dark area is located between the left vehicle lamp light and shade cut-off line and the right vehicle lamp light and shade cut-off line, and the left vehicle lamp main high-beam light shape and/or the right vehicle lamp main high-beam light shape moves left and right to adjust the width and position of the dark area.

7. The anti-glare high-beam lamp according to claim 6, wherein the left vehicle lamp forms the left vehicle lamp main high-beam light shape and a left vehicle lamp auxiliary high-beam light shape adjustable in widening angle, and the right vehicle lamp forms the right vehicle lamp main high-beam light shape and a right vehicle lamp auxiliary high-beam light shape adjustable in widening angle;

the left vehicle lamp main high-beam light shape is overlapped with the left vehicle lamp auxiliary high-beam light shape to form a left vehicle lamp high-beam light shape with the left vehicle lamp light and shade cut-off line and adjustable in light shape widening angle, the right vehicle lamp main high-beam light shape is overlapped with the right vehicle lamp auxiliary high-beam light shape to form a right vehicle lamp high-beam light shape with the right vehicle lamp light and shade cut-off line and adjustable in light shape widening angle, and the left vehicle lamp high-beam light shape is overlapped with the right vehicle lamp high-beam light shape to form a high-beam light shape with the dark area and adjustable in light shape widening angle.

8. The anti-glare high-beam lamp according to claim 6, wherein the left vehicle lamp and the right vehicle lamp each comprise a driving mechanism for driving the high-beam lighting device to move left and right.

9. The anti-glare high-beam lamp according to claim 6, wherein the left vehicle lamp and the right vehicle lamp are each provided with the main high-beam module which is further provided with an auxiliary illumination module, light emitted by the auxiliary illumination module is projected by a main high-beam lens to form a main high-beam supplementary light shape, and the main high-beam supplementary light shape is located in a light-free area on one side of the light and shade cut-off line of the main high-beam light shape.

10. The high-beam lighting device according to claim 1, wherein the main high-beam module further comprises a main primary optical element, a main high-beam circuit board, a main high-beam lens and a main high-beam light source arranged on the main high-beam circuit board, the reflection unit is arranged on the main primary optical element, the main high-beam circuit board and the main high-beam lens are connected to the main primary optical element, and light emitted by the main high-beam light source is reflected by the reflection unit, blocked by the shading structure, incident to the main high-beam lens and then projected by the main high-beam lens to form the main high-beam light shape with the light and shade cut-off line.

11. The high-beam lighting device according to claim 10, wherein the shading structure is arranged or integrally formed on the reflection unit.

12. The high-beam lighting device according to claim 10, wherein a side surface of the main high-beam lens which is connected to a light-emitting surface of this main high-beam lens is provided with a main light-shielding cover.

13. The high-beam lighting device according to claim 10, wherein the main high-beam module is further provided with an auxiliary illumination module, light emitted by the auxiliary illumination module is projected by the main high-beam lens to form a main high-beam supplementary light shape, and the main high-beam supplementary light shape is located in a light-free area on one side of the light and shade cut-off line of the main high-beam light shape.

14. The high-beam lighting device according to claim 13, wherein an edge of the main high-beam supplementary light shape overlaps with the light and shade cut-off line.

15. The high-beam lighting device according to claim 13, wherein the auxiliary illumination module comprises an auxiliary illumination primary optical element, auxiliary illumination sources and an auxiliary illumination circuit board, a light incident surface of the auxiliary illumination primary optical element is provided with at least one auxiliary condensation structure, and the auxiliary illumination sources are located on the auxiliary illumination circuit board and arranged in one-to-one correspondence to the auxiliary condensation structures;

the auxiliary illumination primary optical element is provided with an auxiliary light-emitting surface facing the main high-beam lens, and light emitted by the auxiliary illumination sources is transmitted through the auxiliary illumination primary optical element, emitted to the main high-beam lens through the auxiliary light-emitting surface and then projected by the main high-beam lens to form the main high-beam supplementary light shape.

16. The high-beam lighting device according to claim 15, wherein the auxiliary illumination primary optical element is located between the main primary optical element and the main high-beam lens, and the shading structure is arranged or integrally formed on the auxiliary illumination primary optical element.

* * * * *